(12) United States Patent
Liu et al.

(10) Patent No.: US 10,797,841 B2
(45) Date of Patent: Oct. 6, 2020

(54) ELECTRONIC DEVICE, WIRELESS COMMUNICATION METHOD AND MEDIUM

(71) Applicant: Sony Corporation, Tokyo (JP)

(72) Inventors: Wendong Liu, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/341,073

(22) PCT Filed: Nov. 3, 2017

(86) PCT No.: PCT/CN2017/109353
§ 371 (c)(1),
(2) Date: Apr. 11, 2019

(87) PCT Pub. No.: WO2018/086486
PCT Pub. Date: May 17, 2018

(65) Prior Publication Data
US 2019/0238283 A1 Aug. 1, 2019

(30) Foreign Application Priority Data
Nov. 8, 2016 (CN) .......................... 2016 1 0976414

(51) Int. Cl.
*H04L 5/00* (2006.01)
*H04L 25/02* (2006.01)
(Continued)

(52) U.S. Cl.
CPC ............ *H04L 5/005* (2013.01); *H04B 7/0417* (2013.01); *H04B 7/0617* (2013.01); *H04L 1/06* (2013.01);
(Continued)

(58) Field of Classification Search
CPC ..... H04L 5/005; H04L 25/02; H04L 25/0204; H04L 27/2655; H04B 7/0417;
(Continued)

(56) References Cited

U.S. PATENT DOCUMENTS 9,225,502 B2 * 12/2015 Asplund ................. H04L 1/002
9,967,004 B2 * 5/2018 Seol ..................... H04B 7/0456
(Continued)

FOREIGN PATENT DOCUMENTS

| CN | 101154975 A | 4/2008 |
| CN | 101877884 A | 11/2010 |
| CN | 104539335 A | 4/2015 |

*Primary Examiner* — Warner Wong
(74) *Attorney, Agent, or Firm* — Xsensus LLP

(57) ABSTRACT

The present disclosure is related to an electronic device, wireless communication method and medium. The electronic device comprises circuitry configured to: obtain first channel state comprising at least channel state of a channel from a first apparatus to a first antenna associated with the electronic device, the first apparatus performing wireless communication with the electronic device; and obtain second channel state based on the first channel state, the second channel state comprising channel state of a channel from a second antenna associated with the electronic device to the first apparatus.

18 Claims, 18 Drawing Sheets

(51) Int. Cl.
*H04B 7/0417* (2017.01)
*H04B 7/06* (2006.01)
*H04L 1/06* (2006.01)
*H04W 72/12* (2009.01)
*H04L 5/14* (2006.01)

(52) U.S. Cl.
CPC ............ *H04L 5/14* (2013.01); *H04L 25/0204* (2013.01); *H04L 25/0224* (2013.01); *H04W 72/12* (2013.01)

(58) Field of Classification Search
CPC .. H04B 7/0617; H04B 7/0626; H04B 7/0687; H04B 7/0693
See application file for complete search history.

(56) References Cited

U.S. PATENT DOCUMENTS

| | | | |
|---|---|---|---|
| 9,998,929 B2* | 6/2018 | Seol | H04B 7/0456 |
| 2013/0267222 A1* | 10/2013 | Park | H04B 7/0619 |
| | | | 455/422.1 |
| 2013/0287132 A1* | 10/2013 | Taoka | H04B 7/0452 |
| | | | 375/267 |
| 2013/0301560 A1* | 11/2013 | Geirhofer | H04B 7/0417 |
| | | | 370/329 |
| 2014/0078919 A1* | 3/2014 | Hammarwall | H04L 1/0028 |
| | | | 370/252 |
| 2015/0055555 A1* | 2/2015 | Kim | H04W 24/10 |
| | | | 370/328 |
| 2015/0124736 A1* | 5/2015 | Ko | H04B 7/0626 |
| | | | 370/329 |
| 2015/0146696 A1* | 5/2015 | Golitschek Edler Von Elbwart | H04L 1/0029 |
| | | | 370/335 |
| 2016/0134408 A1* | 5/2016 | Kim | H04B 7/0626 |
| | | | 370/329 |
| 2018/0270808 A1* | 9/2018 | Liu | H04L 5/0057 |
| 2020/0067583 A1* | 2/2020 | Shin | H04B 7/04 |

\* cited by examiner

ELECTRONIC DEVICE, WIRELESS COMMUNICATION METHOD AND MEDIUM

CROSS-REFERENCE TO RELATED APPLICATIONS

The present application is based on PCT filing PCT/CN2017/109353, filed Nov. 3, 2017, which claims priority to Chinese Patent Application No. 201610976414.7, entitled "Electronic Device, Wireless Communication Method and Medium", filed on Nov. 8, 2016, the entire contents of each are incorporated herein by reference.

TECHNICAL FIELD

The present disclosure generally relates to electronic devices, wireless communication methods and media, and more specifically, to signal processing technologies in duplex systems.

BACKGROUND

Frequency division duplex (FDD) and time division duplex (TDD) technologies are widely used in current wireless communication standards. In cellular communication, uplink and downlink transmissions operate in different frequency bands in FDD mode and operate in different time slots in TDD mode to avoid interference between uplink and downlink transmissions. In the case of application of Massive Multiple-Input Multiple-Output (MIMO) technology, the channel characteristics and signal processing technologies under FDD/TDD have been deeply researched by academics and industry.

The FDD/TDD system, however, uses orthogonal frequency/time resource blocks, which reduces resource block utilization and causes system capacity degradation. To further utilize frequency and time resources, full-duplex technology is considered as a key technology for future wireless communication systems. Full-duplex technology may transmit and receive signals simultaneously in the same frequency band, which is described in A. Sabharwal, P. Schniter, D. Guo, D. W. Bliss, and R. Wichman's paper "In-Band Full-Duplex Wireless: Challenges and Opportunities", IEEE Journal on Selected Areas in Communications, vol. 32. no. 9, pp. 1637-1652, September 2014.

Compared to current FDD/TDD technologies, full-duplex technology may utilize frequency and time resources more efficiently and significantly increase system capacity. Two main full-duplex terminal structures are introduced in D. Kim, H. Lee, and D. Hong, "A Survey of In-Band Full-Duplex Transmission: From the Perspective of PHY and MACLayers," IEEE Communications Surveys & Tutorials, vol. 17, no. 4, pp. 2017-2046, November 2015, as illustrated in FIGS. 1 and 2.

Figure 3:
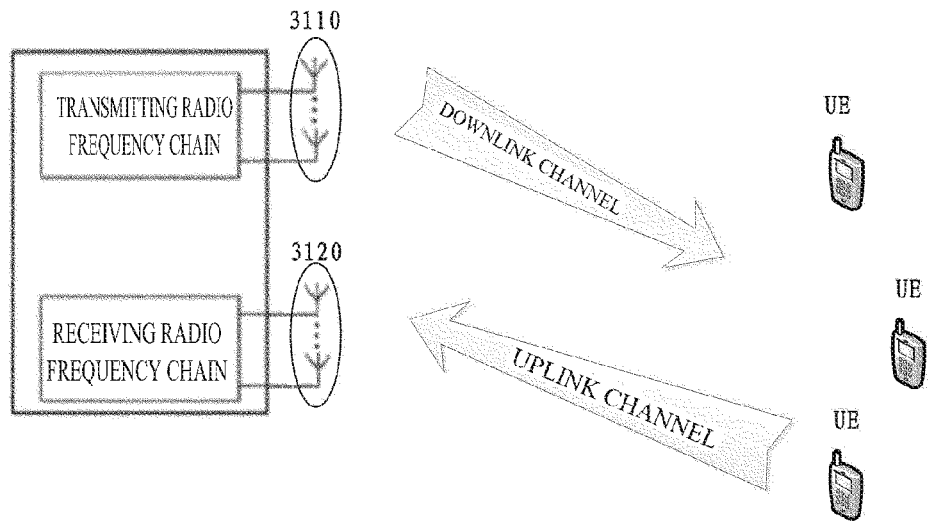

FIG. 3 is a schematic diagram of full-duplex communication employing a separated antenna structure in a multi-user MIMO (MU-MIMO) scenario in the prior art. It is assumed here that the user equipment (UE) may also operate in the full-duplex mode. The base station 3100 uses different antennas in the spatial domain for downlink transmission and uplink reception, and the uplink and downlink transmissions are separated in the spatial domain.

SUMMARY

However, inventors of the present disclosure have found that in the structure of FIG. 3, additional overhead is required for downlink channel estimation and signaling interaction since the correlation between the downlink channel and the uplink channel is not effectively utilized, thereby affecting the operation efficiency of the system.

Therefore, in order to solve or alleviate at least one of the above mentioned problems, the present disclosure provides the following aspects.

According to one aspect of the present disclosure, there is provided an electronic device, characterized in that the electronic device comprises: circuitry configured to obtain a first channel state comprising at least a channel state of a channel from a first apparatus to a first antenna associated with the electronic device, the first apparatus performing wireless communication with the electronic device; obtain a second channel state based on the first channel state, the second channel state comprising a channel state of a channel from a second antenna associated with the electronic device to the first apparatus.

According to another aspect of the present disclosure, there is provided a method for performing wireless communication, characterized in that the method comprises: obtaining a first channel state comprising at least a channel state of a channel from a first apparatus to a first antenna associated with a electronic device, the first apparatus performing wireless communication with the electronic device; obtaining a second channel state based on the first channel state, the second channel state comprising a channel state of a channel from a second antenna associated with the electronic device to the first apparatus.

According to another aspect of the present disclosure, there is provided an electronic device, characterized in that the electronic device comprises: circuitry configured to: transmit a first pilot signal to another electronic device such that the another electronic device are able to obtain a first channel state and obtain a second channel state based on the first channel state, wherein the first channel state comprises at least a channel state of a channel from an antenna associated with the electronic device to a first antenna associated with the another electronic device, the second channel state comprises a channel state of a channel from a second antenna associated with the another electronic device to the antenna associated with the electronic device, and the electronic device performs wireless communication with the another electronic device; and receive a data signal transmitted from the another electronic device using the second channel state.

According to another aspect of the present disclosure, there is provided a method for performing wireless communication, characterized in that the method comprises: transmitting a first pilot signal from a first electronic device to a second electronic device such that the second electronic device are able to obtain a first channel state and obtain a second channel state based on the first channel state, wherein the first channel state includes at least a channel state of a channel from the first electronic device to a first antenna associated with the second electronic device, the second channel state includes a channel state of a channel from a second antenna associated with the second electronic device to the first electronic device, the first electronic device performs wireless communication with the second electronic device; and receiving a data signal transmitted from the second electronic device using the second channel state.

In accordance with another aspect of the present disclosure, there is provided a computer-readable storage medium with instructions stored thereon which, when executed by a processor, cause the processor to perform the above method.

The present disclosure obtains a downlink channel state by using an uplink channel state on the basis of estimated the uplink channel state, thereby reducing system signaling overhead, improving frequency utilization efficiency, and shortening scheduling delay.

DRAWINGS

Figure 1:
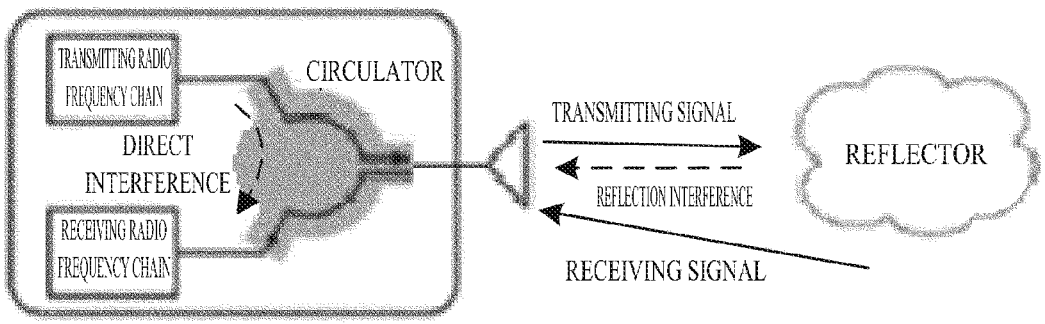
FIG. 1 shows a shared antenna structure that needs to adopt a circulator in hardware to isolate transmitting and receiving signals of the same antenna port.

FIG. 1 is a schematic diagram illustrating a shared antenna structure of a full-duplex system in the prior art.

Figure 2:
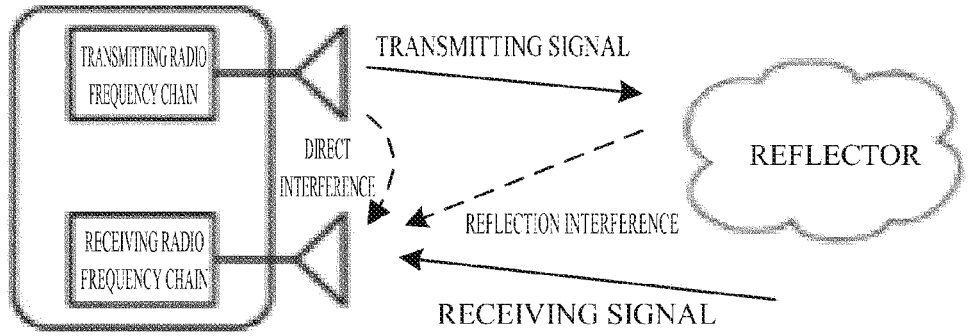
FIG. 2 shows a separated antenna structure with different antennas for connection with transmitting and receiving radio frequency chains. The hardware in the separated antenna structure is simpler to implement compared to the shared antenna structure, and its self-interference cancellation is more convenient and effective.

FIG. 2 is a schematic diagram illustrating a separated antenna structure of a full-duplex system in the prior art.

FIG. 3 is a schematic diagram illustrating full-duplex communication employing a separated antenna structure in the prior art.

Figure 4:
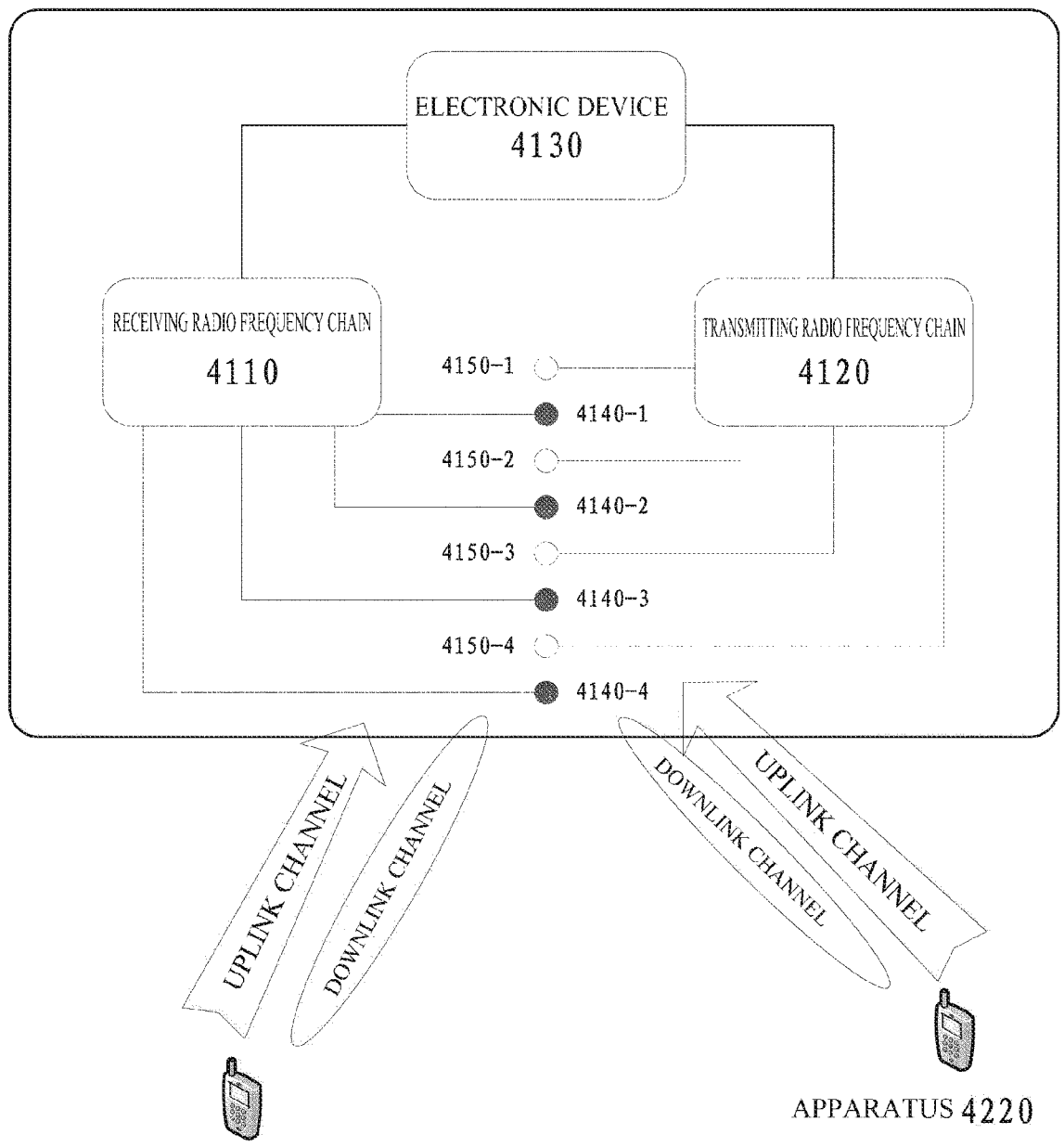

FIG. 4 is a schematic diagram illustrating a communication system in accordance with one or more embodiments of the present disclosure.

Figure 5:
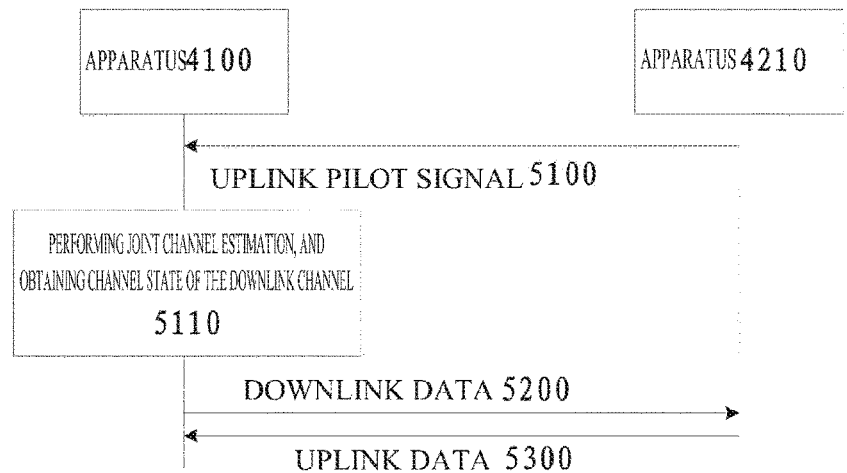

FIG. 5 is a flow chart illustrating communication process in accordance with one or more embodiments of the present disclosure.

Figure 6:
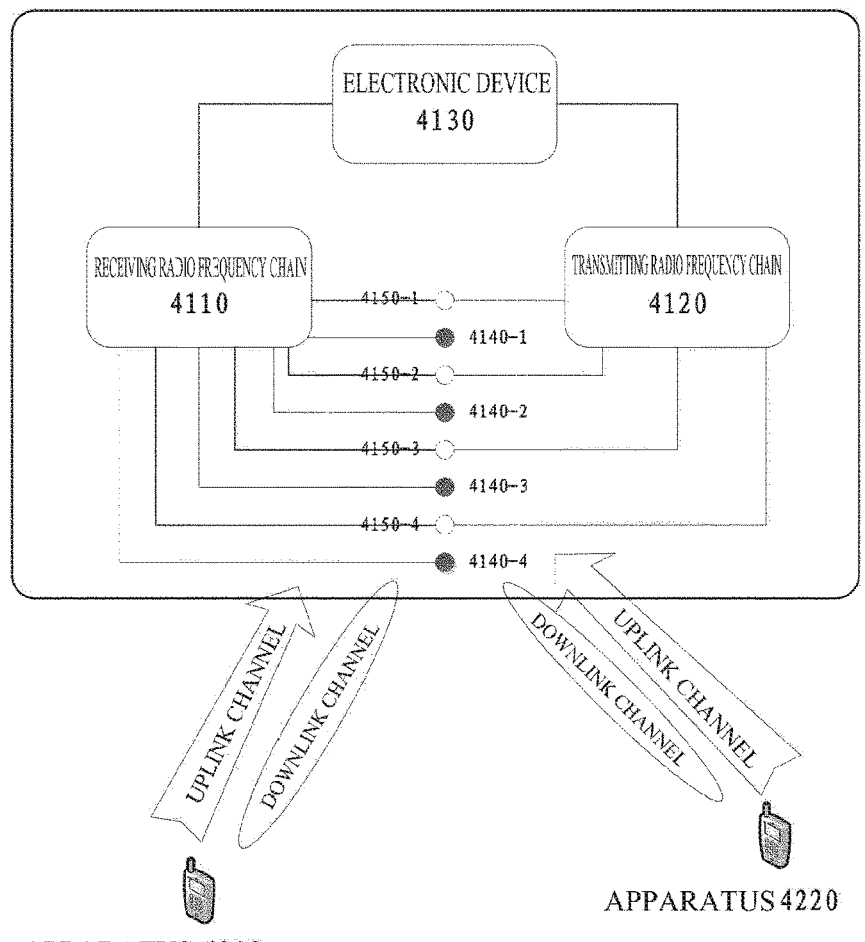

FIG. 6 is a schematic diagram illustrating a communication system in accordance with one or more embodiments of the present disclosure.

Figure 7:
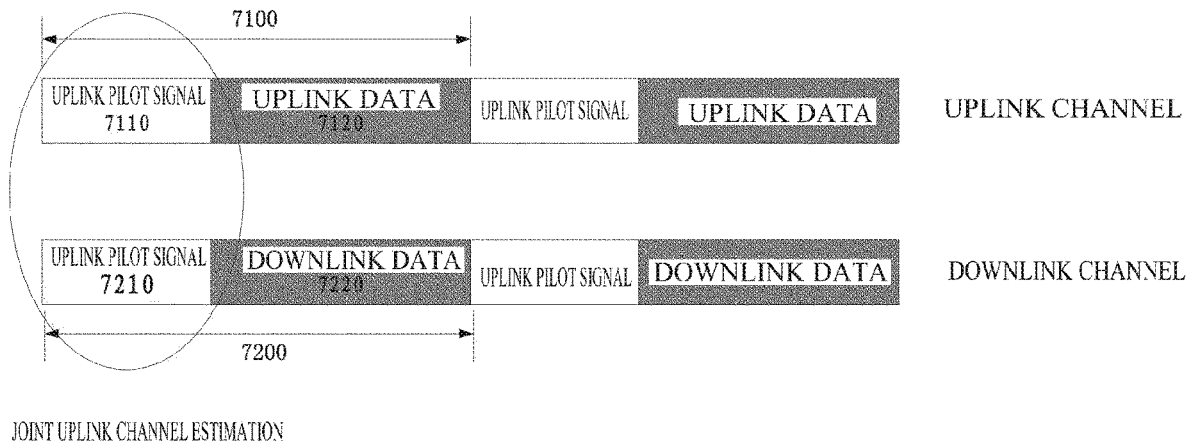

FIG. 7 is a diagram illustrating a frame structure for performing wireless communication in accordance with one or more embodiments of the present disclosure.

Figure 8:
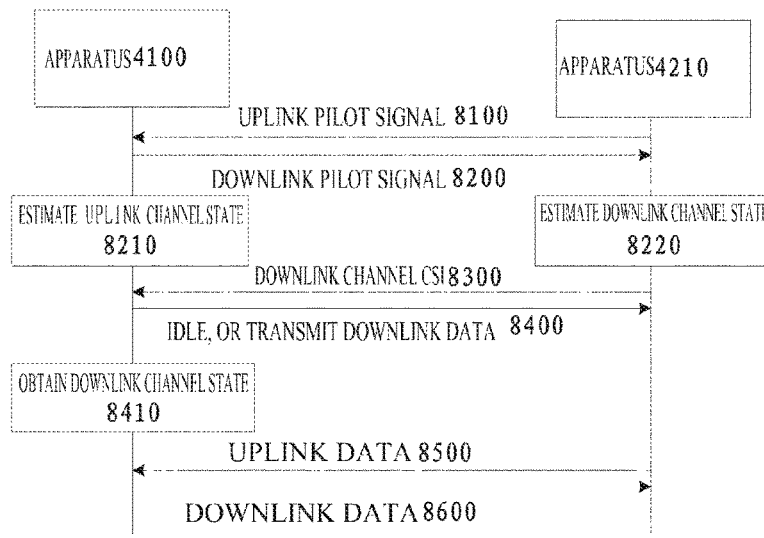

FIG. 8 is a flowchart illustrating communication process in accordance with one or more embodiments of the present disclosure.

Figure 9:
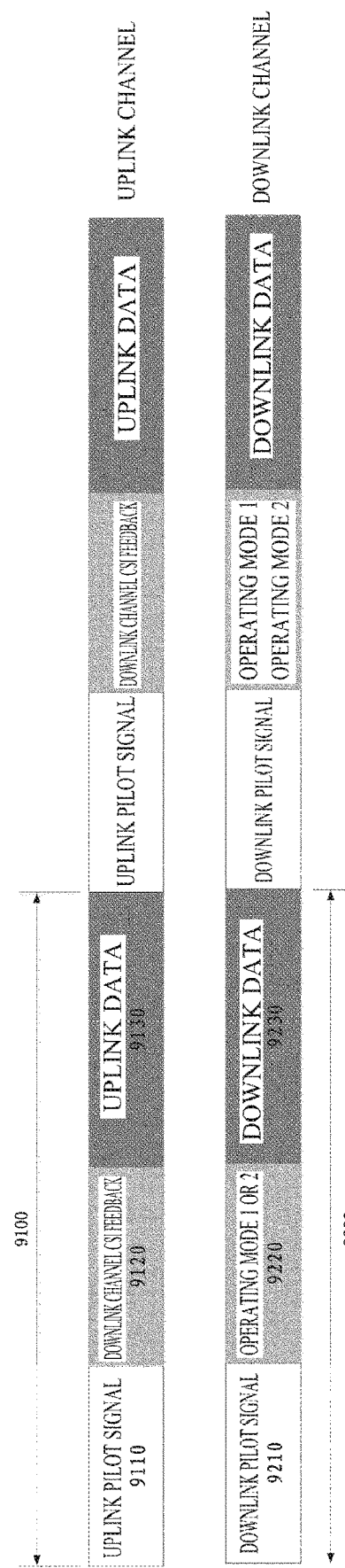

FIG. 9 is a diagram illustrating a frame structure for performing wireless communication, according to one or more embodiments of the present disclosure.

Figure 10:
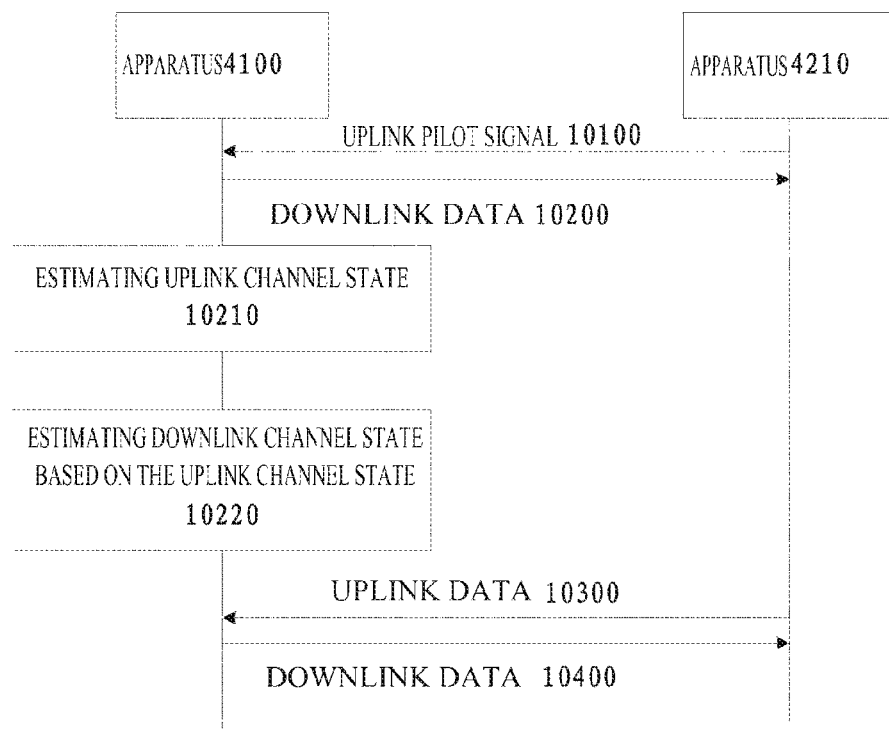

FIG. 10 is a flowchart illustrating communication process in accordance with one or more embodiments of the present disclosure.

Figure 11:
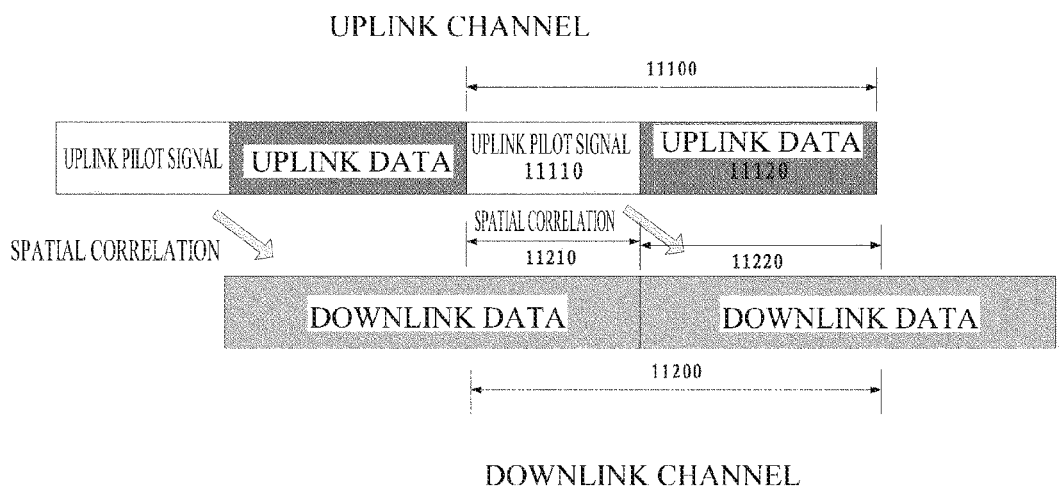

FIG. 11 is a diagram illustrating a frame structure for performing wireless communication, according to one or more embodiments of the present disclosure.

Figure 12:
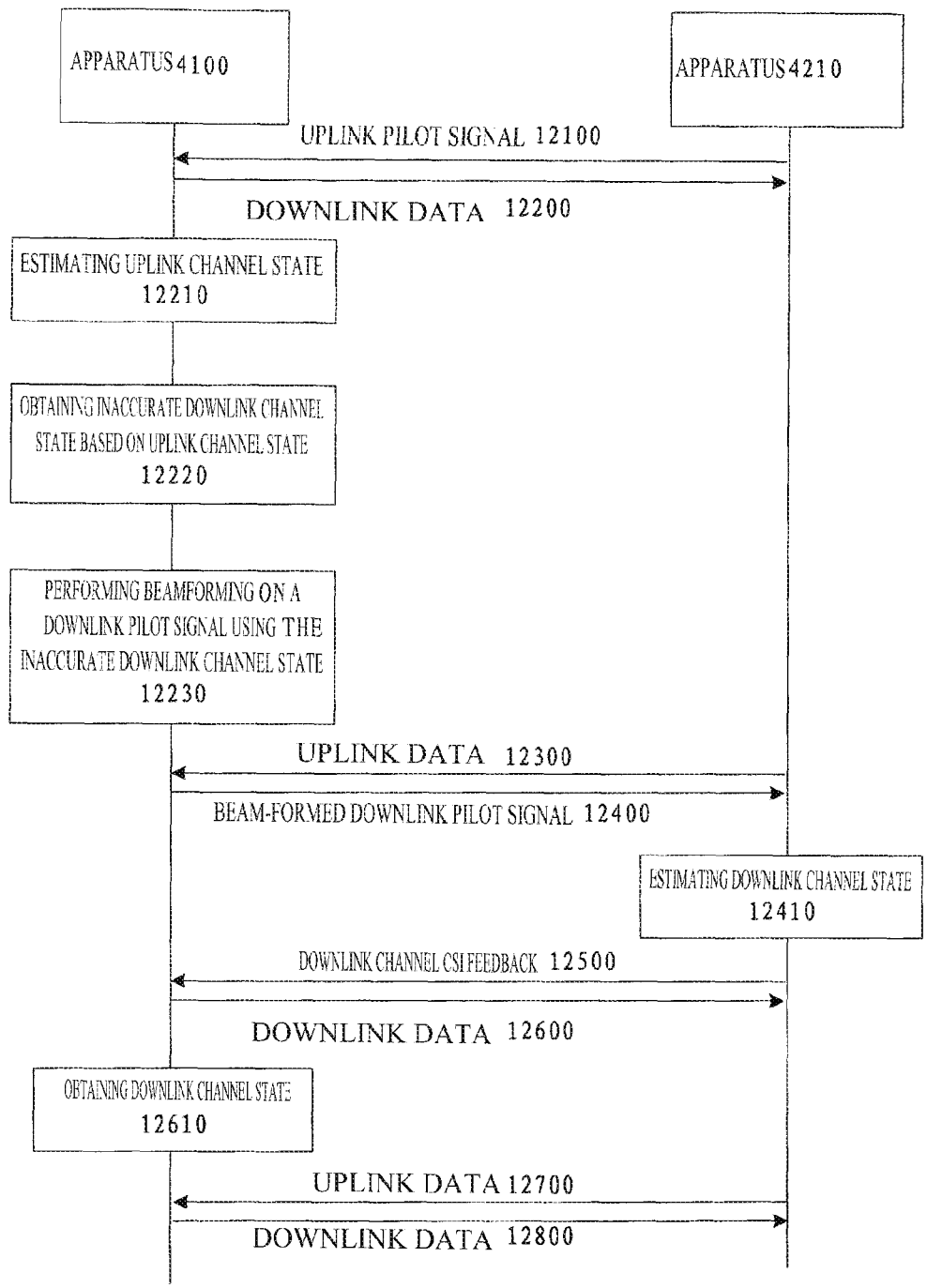

FIG. 12 is a flowchart illustrating communication process in accordance with one or more embodiments of the present disclosure.

Figure 13:
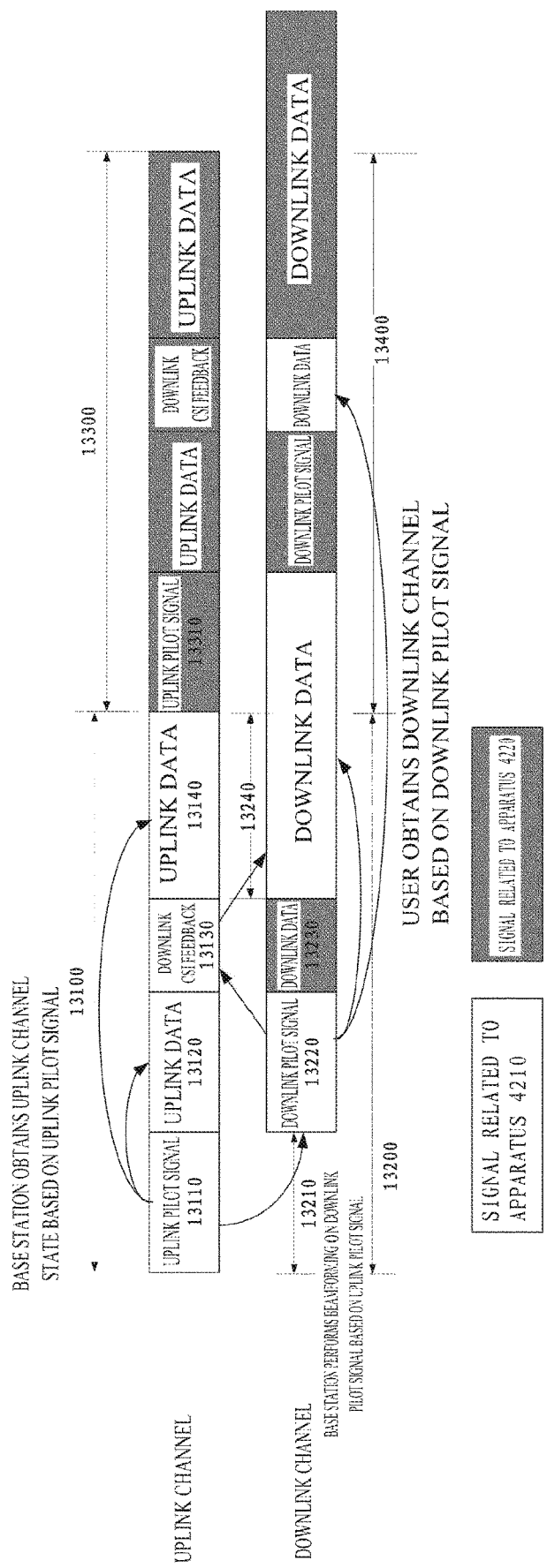

FIG. 13 is a diagram illustrating a frame structure for performing wireless communication, according to one or more embodiments of the present disclosure.

Figure 14:
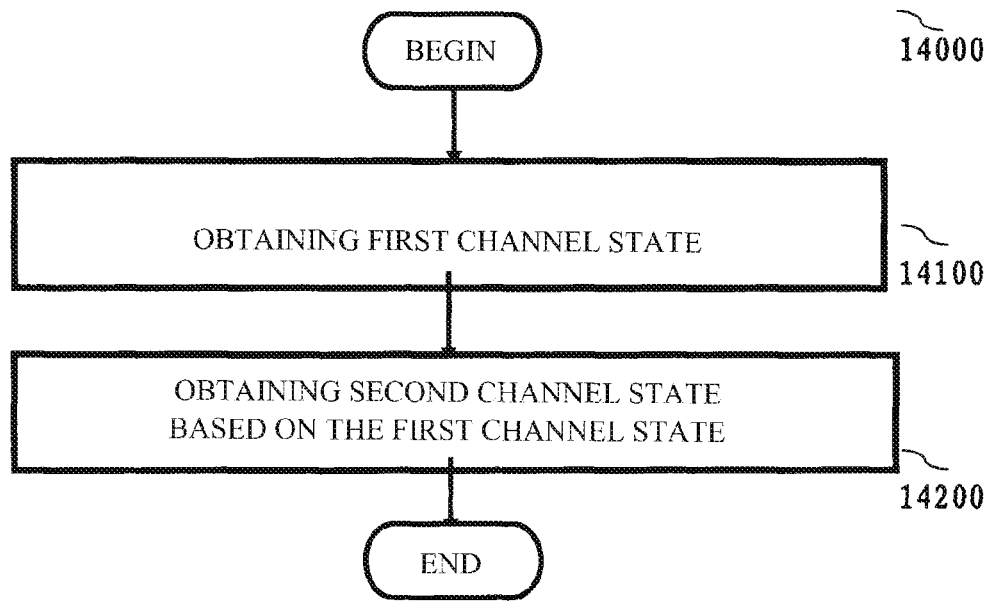

FIG. 14 is a diagram illustrating a method for performing wireless communication, in accordance with one or more embodiments of the present disclosure.

Figure 15:
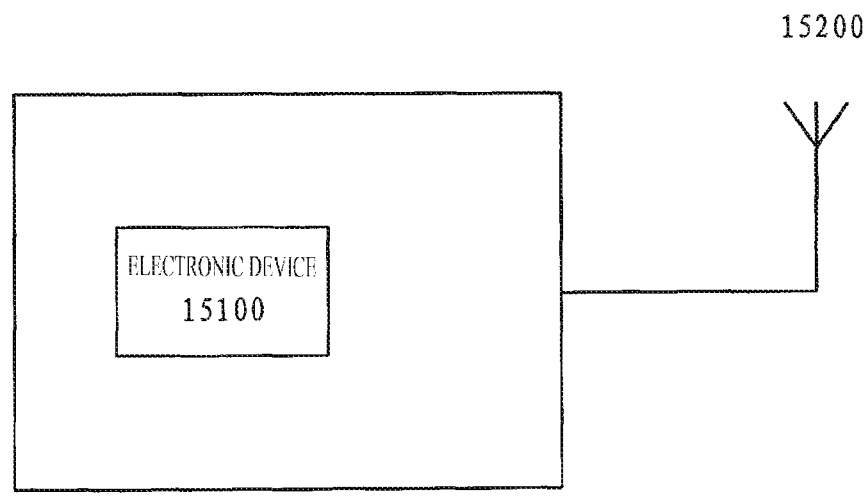

FIG. 15 is a schematic diagram illustrating a communication apparatus in accordance with one or more embodiments of the present disclosure.

Figure 16:
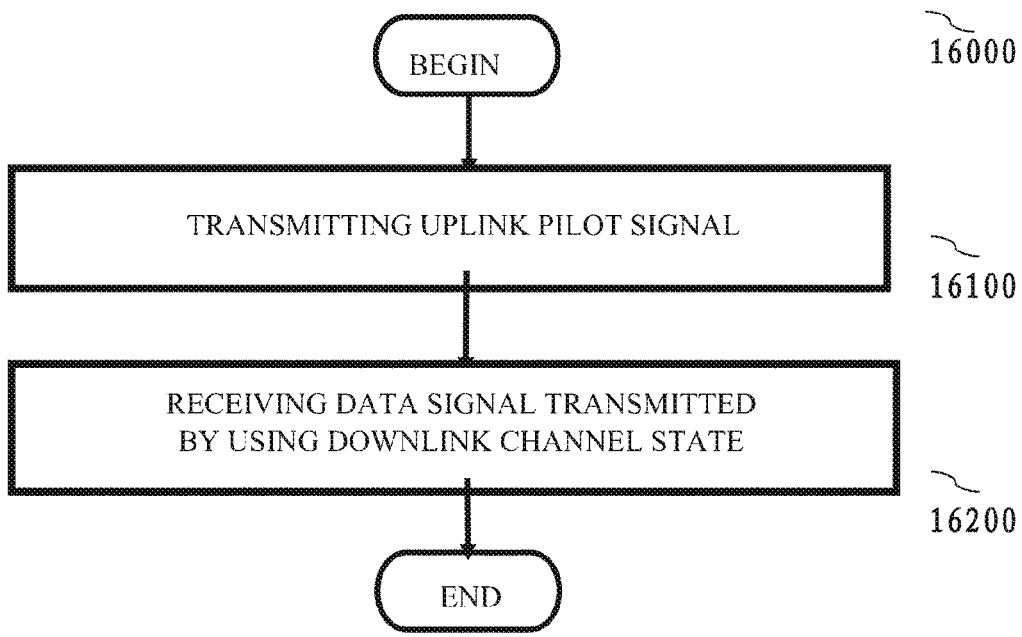

FIG. 16 is a diagram illustrating a method for performing wireless communication, in accordance with one or more embodiments of the present disclosure.

Figure 17:
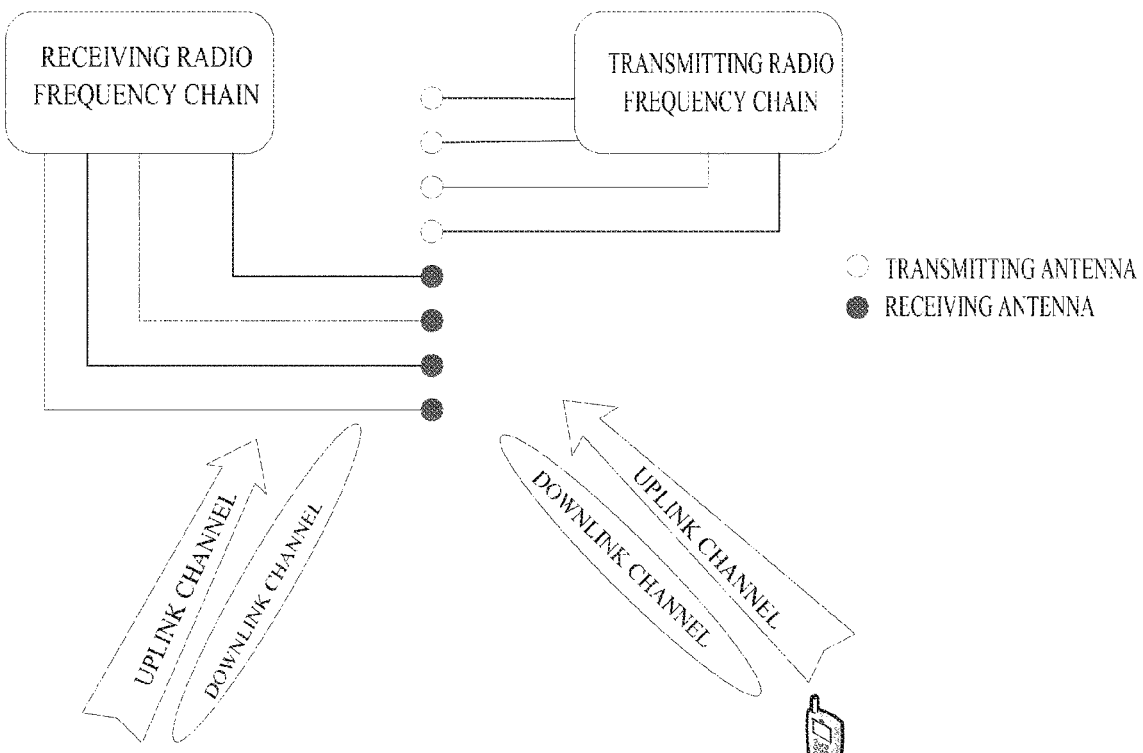

FIG. 17 is a schematic diagram illustrating an arrangement of antennas according to one or more embodiments of the present disclosure.

Figure 18:
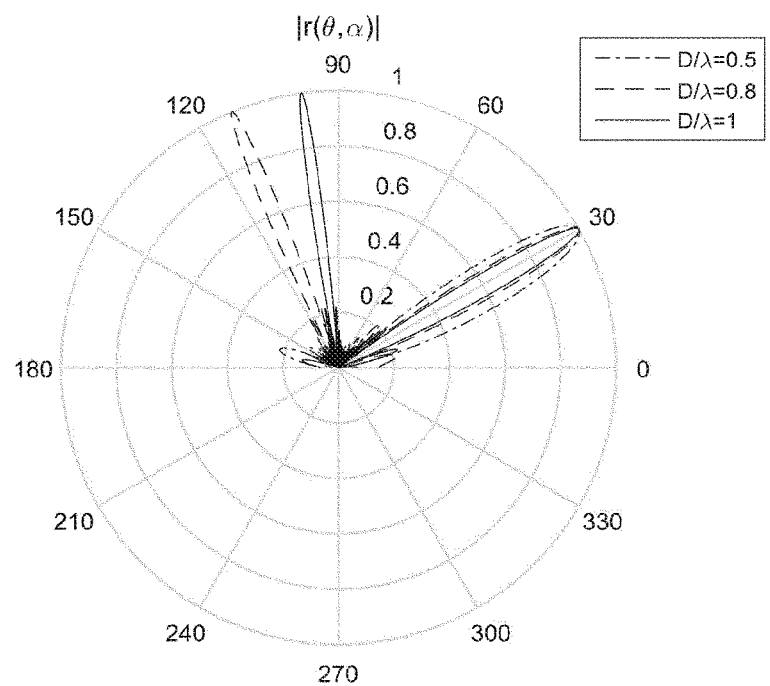

FIG. 18 is a schematic diagram illustrating beams at different antenna spacing.

Figure 19:
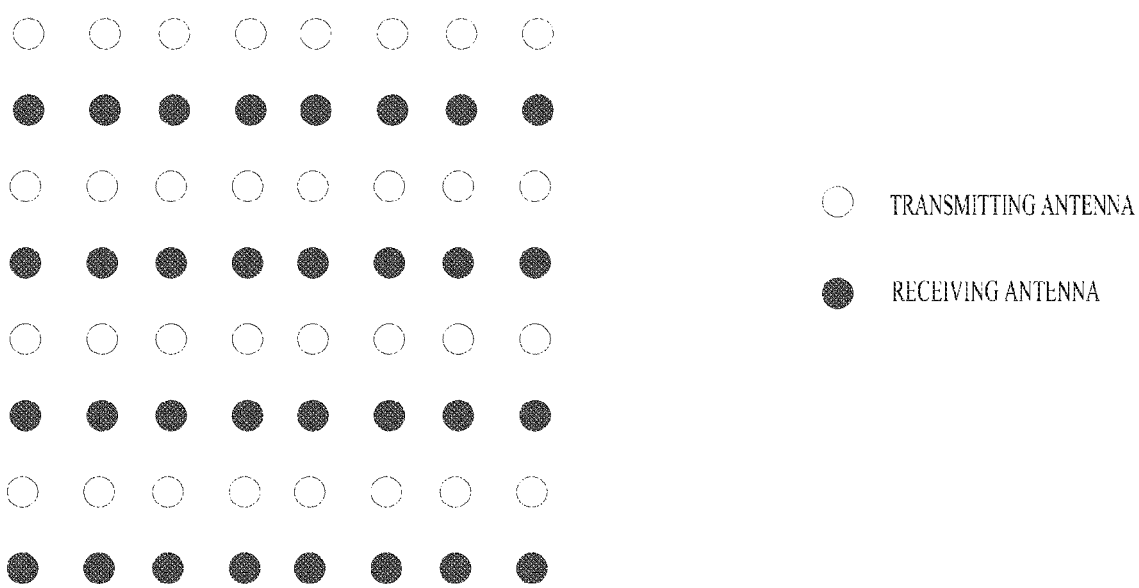

FIG. 19 is a schematic diagram illustrating an arrangement of antennas according to one or more embodiments of the present disclosure.

Figure 20:
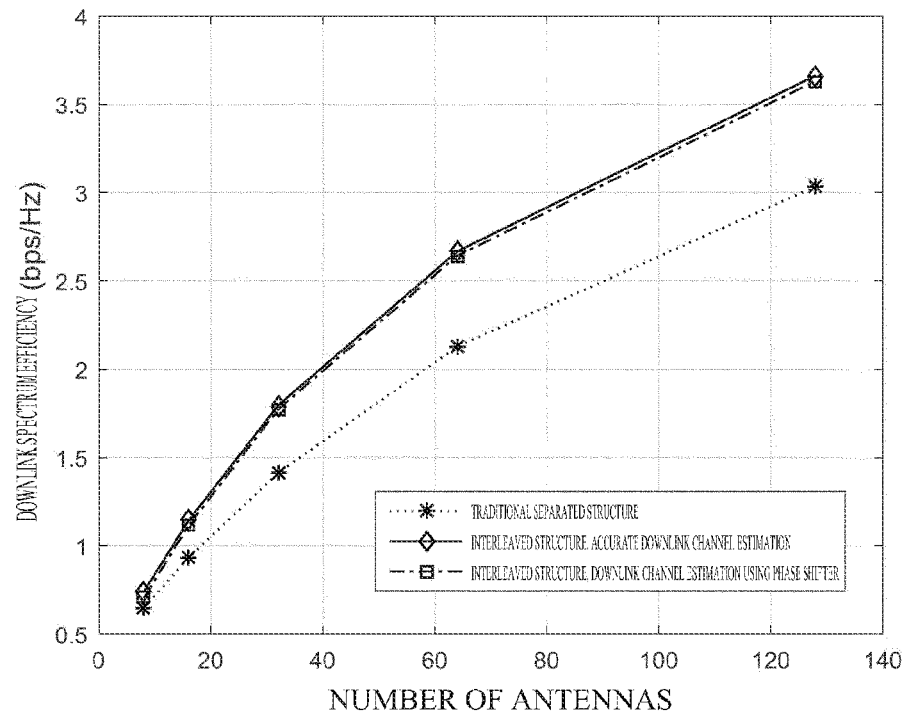

FIG. 20 is a cumulative distribution function diagram of the downlink average spectrum efficiency of a cell in an NLOS channel scenario.

Figure 21:
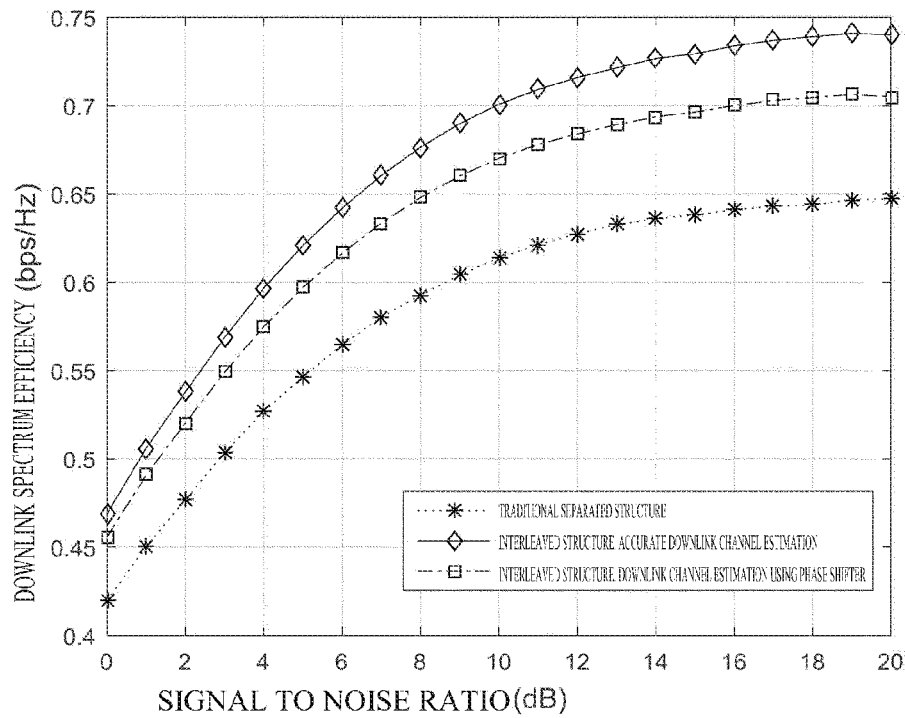

FIG. 21 is a diagram of the downlink average spectrum efficiency performance of a cell in an NLOS channel scenario and different signal to noise ratio environments.

Figure 22:
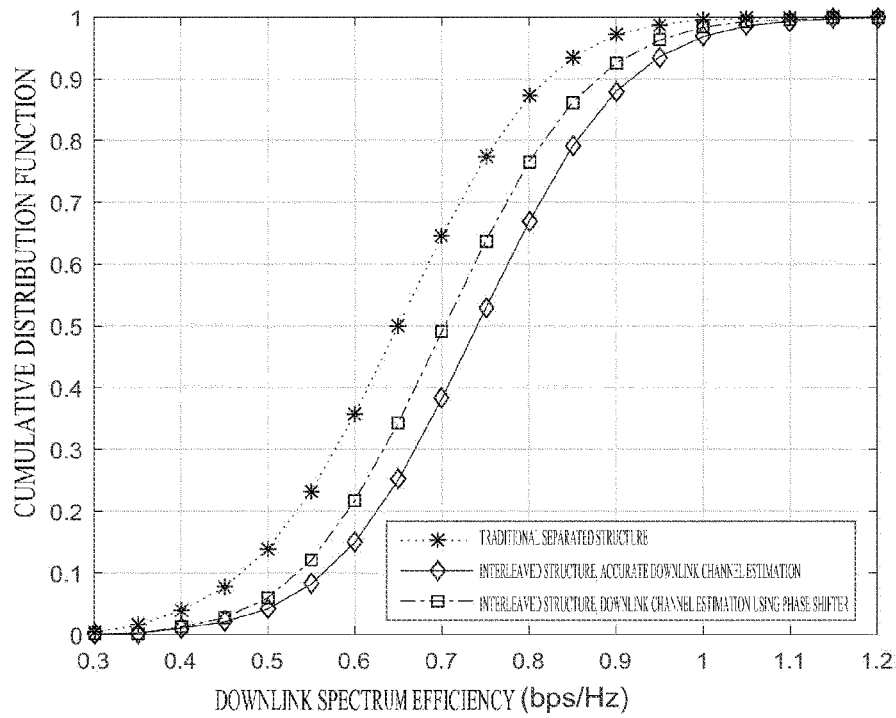

FIG. 22 is a diagram illustrating the downlink average spectrum efficiency performance of a cell in the NLOS channel scenario and different number of antennas.

Figure 23:
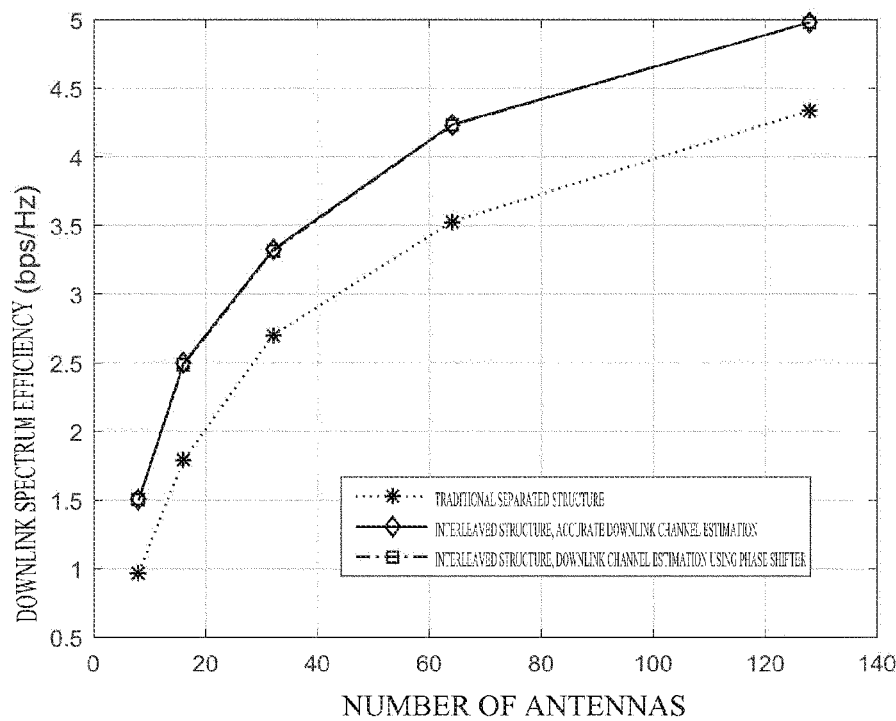
Figure 24:
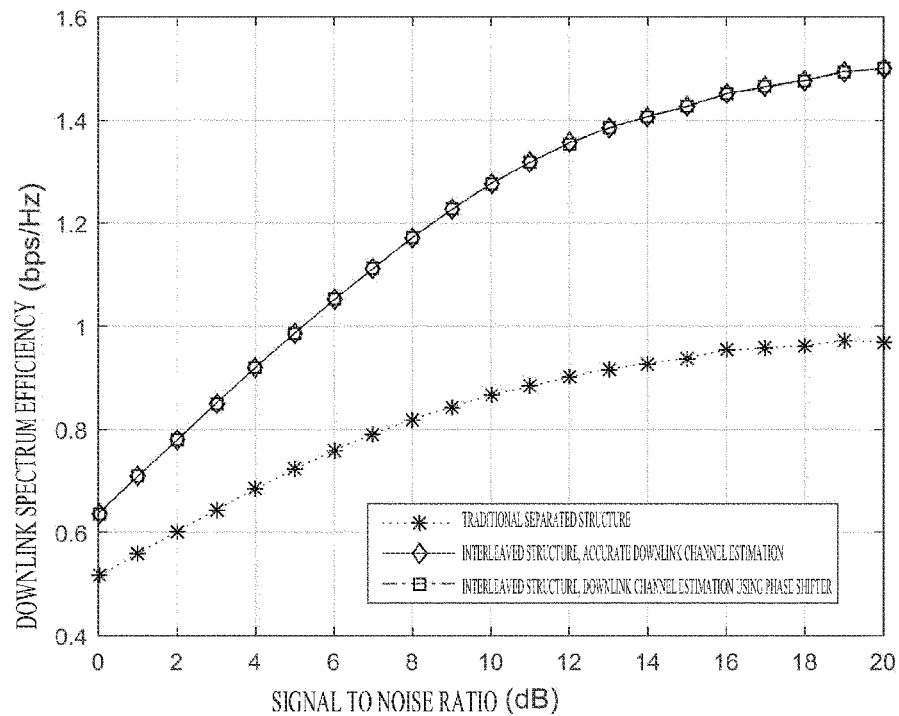
Figure 25:
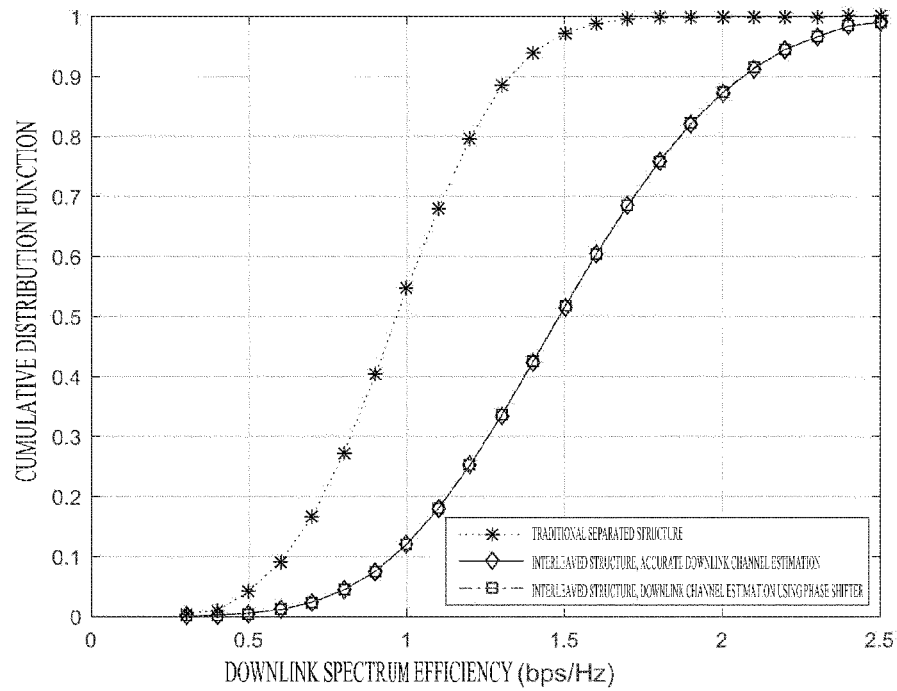

FIGS. 23, 24, and 25 are simulation diagrams illustrating a LOS channel scenario corresponding to an NLOS channel scenario, respectively.

Figure 26:
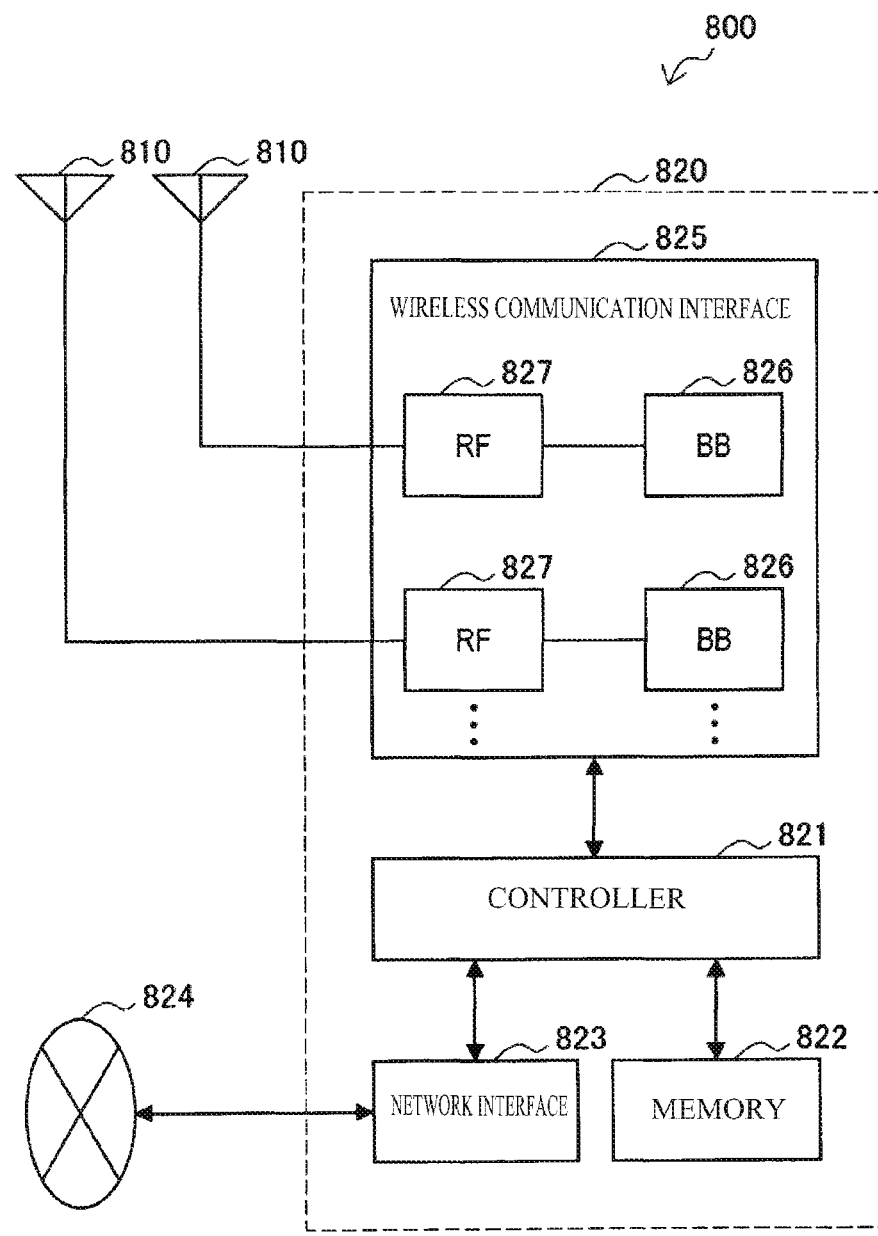

FIG. 26 is a block diagram illustrating a first example of a schematic configuration of an eNB.

Figure 27:
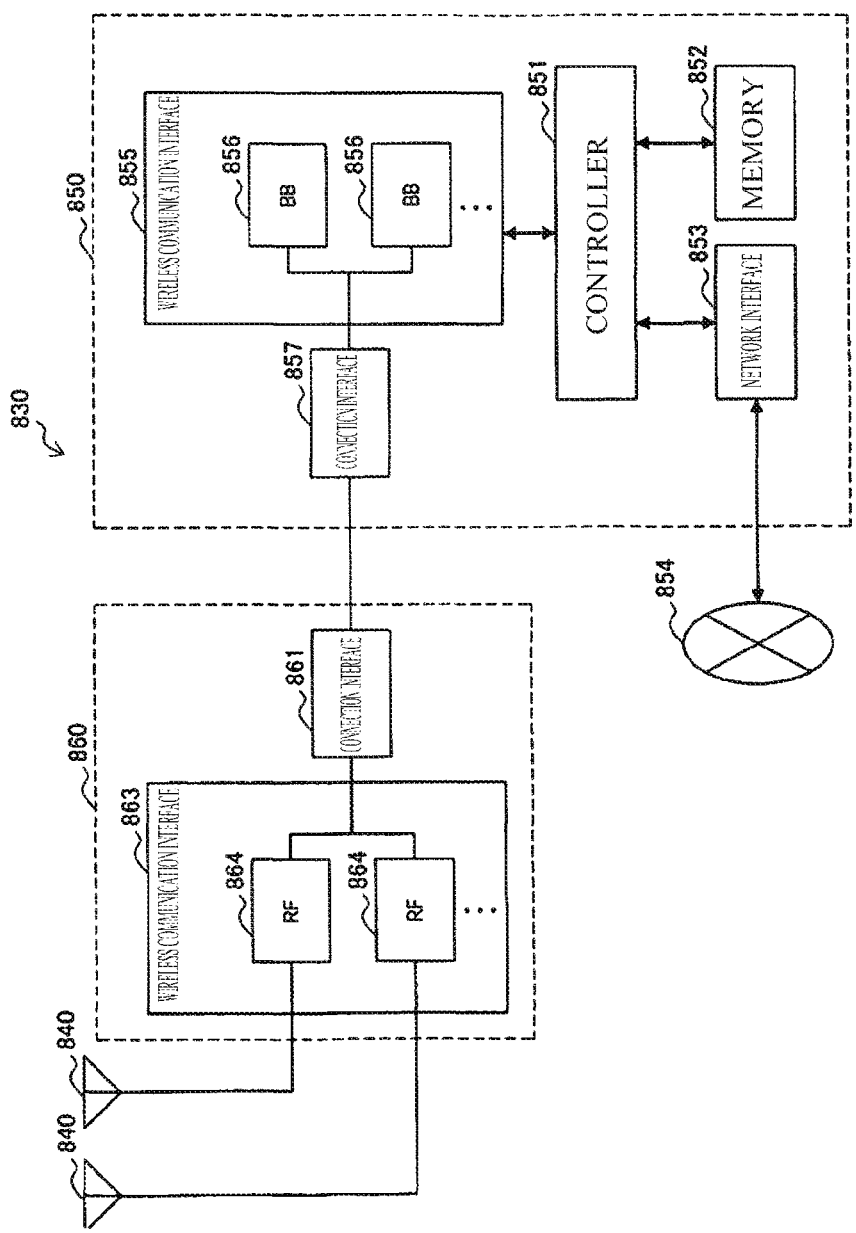

FIG. 27 is a block diagram illustrating a second example of a schematic configuration of an eNB.

Figure 28:
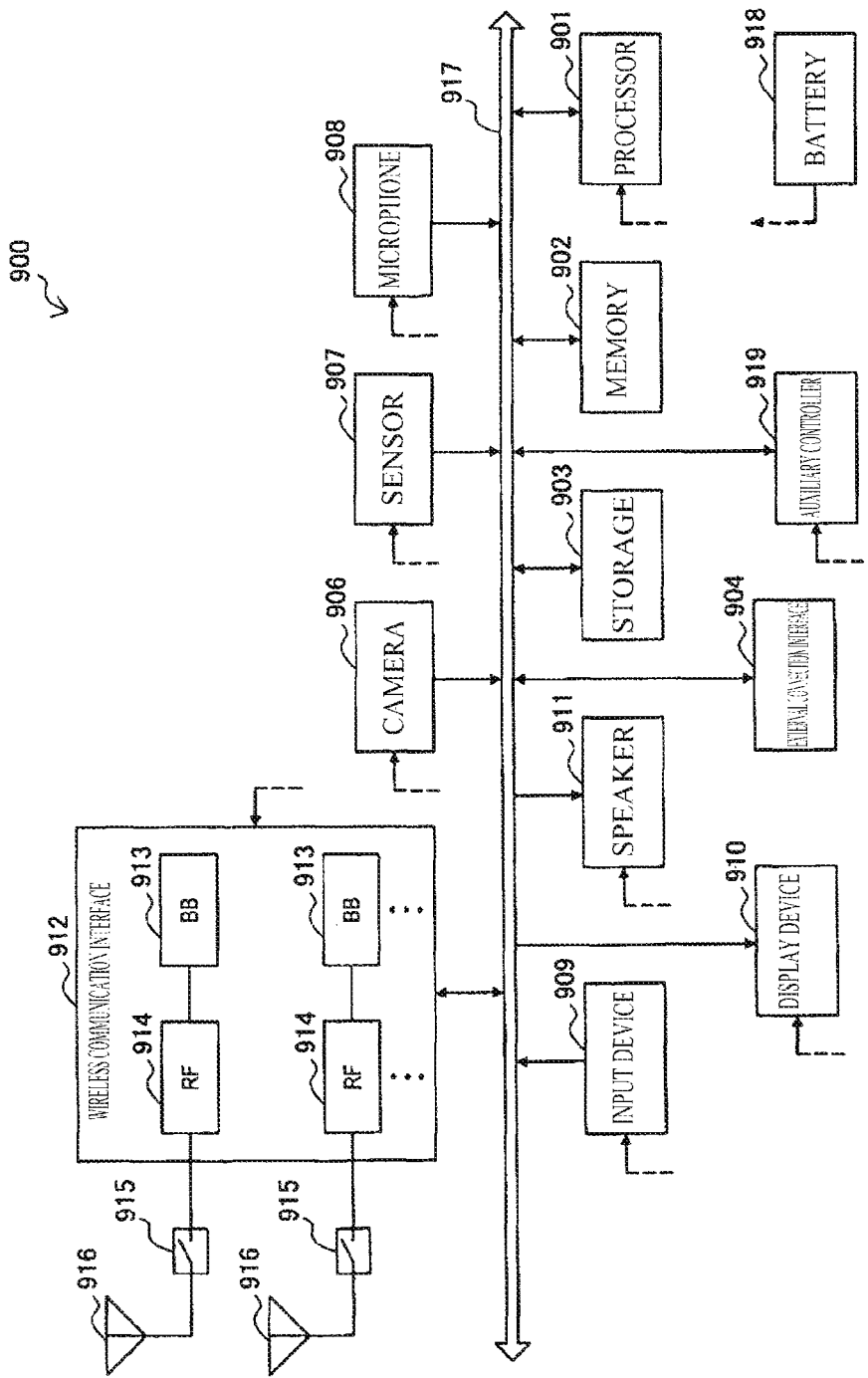

FIG. 28 is a block diagram illustrating an example of a schematic configuration of a smartphone.

Figure 29:
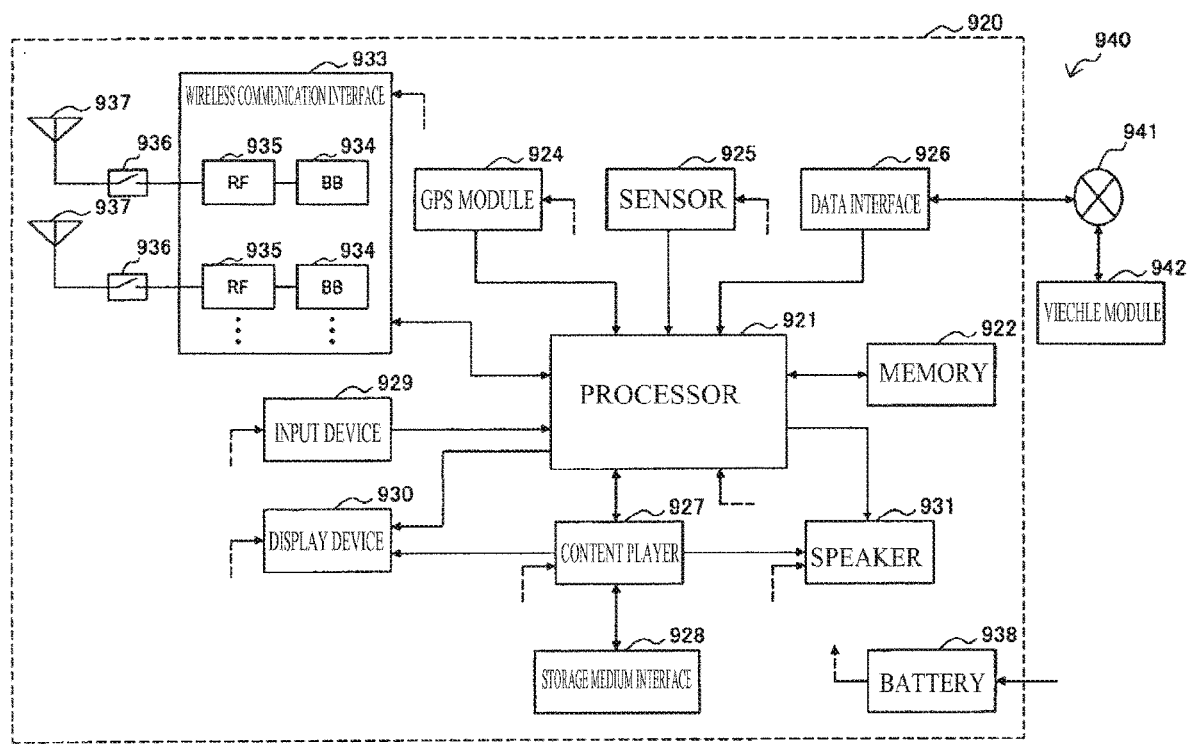

FIG. 29 is a block diagram illustrating an example of a schematic configuration of a car navigation device.

DETAILED DESCRIPTION

Hereinafter, preferred embodiments of the present disclosure will be described in detail with reference to the accompanying drawings. Note that, in this specification and the appended drawings, structural elements that have substantially the same function and structure are denoted with the same reference numerals, and the repeated explanation of these structural elements is omitted.

The description will be made in the following order.
1. System Overview
2. Device and process at base station end
3. Device and process at user end
4. Design of antennas
5. Simulation result
6. Application examples
7. Conclusion

1. SYSTEM OVERVIEW

In the system of FIG. 3, a single cell multi-user scenario is considered. It is assumed that the base station 3100 serves K user equipments (UEs) (not all shown) simultaneously, and it is assumed that each of user equipments is installed one transmitting antenna and one receiving antenna. In FIG. 3, the cell center base station 3100 operates in full-duplex mode using a traditional separated antenna structure. A narrow-band multipath spatial channel is used, assuming P multipaths, and the transmitting antenna array 3120 and the receiving antenna array 3110 of the base station 3100 are both M×1 uniform linear antenna arrays (ULA). The downlink and uplink channels between the base station 3100 and the $k^{th}$ user equipment are expressed as $h_k^{DL}$ and $h_k^{UL}$, respectively, $$h_k^{DL} = \rho_{k,0}^{DL} a(\theta_{k,0}) + \Sigma_1^P \rho_{k,p}^{DL} a(\theta_{k,p}), \quad \text{(equation 1)}$$

$$h_k^{UL} = \rho_{k,0}^{UL} a(\vartheta_{k,0}) + \Sigma_1^P \rho_{k,p}^{UL} a(\vartheta_{k,p}), \quad \text{(equation 2)}$$

For the downlink channel, $h_k^{DL}$, $$a(\theta_{k,p}) = \left[ e^{-j2\pi \frac{mD}{\lambda} \cos\theta_{k,p}} \right]_{0 < m < M}$$

is the steering vector of the p-th sub-path of the downlink channel of the base station 3100 and the k-th user equipment, m is the numbering an antenna whose angle of departure (AoD) is $\theta_{k,p}$ and large-scale fading coefficient is $\rho_{k,p}^{DL}$. Generally, the antenna spacing is D=λ/2. Similarly, for the uplink channel, $h_k^{UL}$, $$a(\vartheta_{k,0}) = \left[ e^{-j2\pi \frac{mD}{\lambda} \cos \vartheta_{k,p}} \right]_{0 < m < M}$$

is the steering vector of the p-th sub-path of the uplink channel of the base station 3100 and the k-th user equipment, of which the angle of arrival (AoA) is $\vartheta_{k,p}$ and corresponding large-scale fading coefficient is $\rho_{k,p}^{UL}$.

This channel model may be used for Non-line-of-sight (NLOS) and Line-of-sight (LOS) models, where $\rho_{k,0}^{DL} a(\theta_{k,0})$ and $\rho_{k,0}^{UL} a(\vartheta_{k,0})$ are representative of direct path component. For the NLOS channel, there is $\rho_{k,0}^{DL}=0$ and $\rho_{k,0}^{UL}=0$. For the LOS channel, $\rho_{k,0}^{DL}$ and $\rho_{k,0}^{UL}$ is generally 5 dB to 10 dB larger than $\rho_{k,p}^{DL}$ and $\rho_{k,p}^{UL}$. In this model, self-interference may be suppressed in, for example, the digital domain, the analog circuit domain, or the signal propagation domain, such that downlink and uplink transmissions are considered independent of each other. Existing signal processing algorithms such as channel estimation, signal detection, and beamforming etc. for FDD/TDD systems may be applied to this system.

FIG. 4 is a schematic diagram illustrating a communication system 4000 in accordance with one or more embodiments of the present disclosure. In communication system 4000, apparatus 4100 is in wireless communication with apparatus 4210, apparatus 4220, and other user equipment (not shown).

Apparatus 4100 includes a receiving radio frequency chain 4110, a transmitting radio frequency chain 4120, an electronic device 4130, a receiving antenna array 4140 (filled circles), a transmitting antenna array 4150 (hollow circles), and other components (not shown). The receiving radio frequency chain 4110 is coupled to the receiving antenna array 4140 (filled circles) and the transmitting radio frequency chain 4120 is coupled to the transmitting antenna array 4150 (hollow circles). In addition, the receiving radio frequency chain 4110 and the transmitting radio frequency chain 4120 are also coupled to the electronic device 4130.

Here, the electronic device 4130 may exchange signals with the receiving radio frequency chain 4110 and the transmitting radio frequency chain 4120. The electronic device 4130 may also control the operation in the receiving radio frequency chain 4110 and the transmitting radio frequency chain 4120. Although the electronic device 4130 is shown separated from the receiving radio frequency chain 4110, the transmitting radio frequency chain 4120, the receiving antenna array 4140 and the transmitting antenna array 4150 in FIG. 4, the electronic device 4130 may also be implemented to further include one or more of the receiving radio frequency chain 4110, transmitting radio frequency chain 4120, the receiving antenna array 4140 and the transmitting antenna array 4150, or implemented as the apparatus 4100 itself.

In communication system 4000, the receiving antenna array 4140 is a uniform linear array with antenna spacings of λ, including antenna elements 4140-1, 4140-2, 4140-3, 4140-4, . . . . The transmitting antenna array 4150 is a uniform linear array with antenna spacings of λ, including antenna elements 4150-1, 4150-2, 4150-3, 4150-4, . . . . It is assumed here that the transmitting antenna array 4150 and the receiving antenna array 4140 have M antenna elements, respectively, and M is an arbitrary positive integer. However, unlike the communication system in FIG. 3, in the communication system 4000, the transmitting antenna array 4150 and the receiving antenna array 4140 are arranged in an interleaved manner. Thus, the combination of the transmitting antenna array 4150 and the receiving antenna array 4140 constitutes a 2M×1 uniform linear array. In this 2M×1 uniform linear array, the spacing between adjacent antennas is preferably D=λ/2.

In the communication system 4000, the equivalent antenna spacing of each of the transmitting antenna array 4150 and the receiving antenna array 4140 is D'=2D=λ, compared to the separated antenna structure in FIG. 3. Thus, it may be used to generate a narrower beam and improve the performance of beamforming. Meanwhile, in the communication system 4000, the transmitting antenna column 4150 and the receiving antenna column 4140 are in the same spatial region and are arranged in an interleaved manner instead of being completely separated like the separated antenna structure in FIG. 3. Thus, in the communication system 4000, the spatial correlation of the uplink and downlink channels may be used to reduce channel estimation overhead and improve spectrum efficiency.

In the communication system 4000, the downlink and uplink channels are expressed as $g_k^{DL}$ and $g_k^{UL}$, respectively, $$g_k^{DL} = \rho_{k,0} a^{DL}(\theta_{k,0}) + \Sigma_1^P \rho_{k,p} a^{DL}(\theta_{k,p}), \qquad \text{(equation 3)}$$

$$g_k^{UL} = \rho_{k,0} a^{UL}(\theta_{k,0}) + \Sigma_1^P \rho_{k,p} a^{UL}(\theta_{k,p}), \qquad \text{(equation 4)}$$

Wherein, the symbols as same as that of the equation 1 and 2 have same meanings, and are not described herein again. The downlink and uplink steering vectors $a^{DL}(\theta_{k,p})$ and $a^{UL}(\theta_{k,p})$, respectively, are $$a^{DL}(\theta_{k,p}) = \left[ 1, e^{-j2\pi \frac{2D}{\lambda} \cos \theta_{k,p}}, \ldots, e^{-j2\pi(2M-2)\frac{D}{\lambda} \cos \theta_{k,p}} \right]^T,$$

$$a^{UL}(\theta_{k,p}) = \left[ e^{-j2\pi \frac{2D}{\lambda} \cos \theta_{k,p}}, e^{-j2\pi \frac{3D}{\lambda} \cos \theta_{k,p}}, \ldots, e^{-j2\pi(2M-1)\frac{D}{\lambda} \cos \theta_{k,p}} \right]^T$$

In the communication system 4000, the angle of departure of the downlink channel is consistent with the angle of arrival of the uplink channel, and their large-scale fading coefficients keep consistent. This is the result based on channel reciprocity. While this assumption is not conformant in the traditional separated antenna structure because the spatial division of the downlink antenna and the uplink antenna causes channel asymmetry. At the same time, $a^{DL}(\theta_{k,p})$ and $a^{UL}(\theta_{k,p})$ satisfy the relationship:

$$a^{DL}(\theta_{k,p}) = a^{UL}(\theta_{k,p}) e^{-j2\pi \frac{D}{\lambda} \cos \theta_{k,p}} \qquad \text{(equation 5)}$$

Equation 5 characterizes the channel correlation that exists between the downlink channel and the uplink channel. Especially in the LOS channel, since the direct path energy attenuation is small and the influence of the reflection path is weak, there may have the following approximation:

$$g_k^{DL} = g_k^{UL} e^{-j2\pi \frac{D}{\lambda} \cos \theta_{k,0}} \qquad \text{(equation 6)}$$

Equation 6 shows that the downlink channel may be estimated through the estimated uplink channel.

One or more embodiments of the present invention provide an electronic device and a corresponding communication method for performing simple downlink channel estimation without requiring an additional downlink reference signal by utilizing the above-described properties of the uplink channel and the downlink channel, and provide an improved frame structure.

In the following, one or more embodiments of the present invention are described with the communication system 4000 as an example. The apparatus 4100 may be implemented as a base station, a Node B, an e-NodeB, a repeater, and the like. The apparatus 4210 and 4220 may be implemented as a terminal device such as a cellular phone, an in-vehicle terminal, and the like.

One or more embodiments of the present invention are described below with the apparatus 4100 being implemented as a base station, apparatus 4210 and 4220 being implemented as user equipments as an example. For convenience of description, the transmission from apparatus 4100 to apparatus 4210 and 4220 herein is referred to as downlink transmission, and the transmission from apparatus 4210 and 4220 to apparatus 4100 is referred to as uplink transmission. Where apparatus 4100 is not a base station, apparatus 4210 and 4220 are not user equipments, transmissions from apparatus 4100 to apparatus 4210 and 4220 may not be referred to as downlink transmissions, and transmissions from apparatus 4210 and 4220 to apparatus 4100 may not be referred to as uplink transmission.

2. DEVICE AND PROCESSING AT BASE STATION END

In accordance with one or more embodiments of the invention, electronic device 4130 may be configured to obtain a first channel state. The first channel state includes at least a state of an uplink channel from the apparatus 4210 to the receiving antenna array 4140 associated with the electronic device 4130. The electronic device 4130 may obtain a second channel state based on the first channel state. The second channel state includes a channel state of a downlink channel from the transmitting antenna array 4150 associated with the electronic device 4130 to the apparatus 4210.

In the following, the electronic device 4130, and the corresponding frame structure, will be specifically described in conjunction with FIGS. 5-14.

In one or more embodiments of the invention, the first channel state may also include a channel state of an uplink channel from the apparatus 4210 to the transmitting antenna array 4150 associated with the electronic device 4130. Here, the transmitting antenna array 4150 may not only transmit signals but also receive signals. After obtaining the channel state of the uplink channel from the apparatus 4210 to the transmitting antenna array 4150 associated with the electronic device 4130, the electronic device 4130 may obtain the channel state of the downlink channel from the transmitting antenna array 4150 associated with the electronic device 4130 to the apparatus 4210 based on the uplink and downlink channel reciprocity.

For example, the electronic device 4130 may perform joint channel estimation based on the uplink pilot signals received by the receiving antenna array 4140 and the transmitting antenna array 4150 from the apparatus 4210, thereby obtaining the uplink channel state from the apparatus 4210 to the receiving antenna array 4140, and the channel state of the downlink channel from the transmitting antenna array 4150 to the apparatus 4210. Here, the joint channel estimation refers to performing overall channel estimation based on the pilot signals received by the receiving antenna array 4140 and the transmitting antenna array 4150, instead of separately performing channel estimation based on the pilot signals received by the receiving antenna array 4140 and separately performing channel estimation based on the pilot signals received by the transmitting antenna array 4150. For example, the electronic device 4130 may obtain a joint channel matrix by the joint channel estimation, and then obtain the downlink channel state by permuting lines or columns of the joint channel matrix.

FIG. 5 illustrates a flow chart of communication process between apparatus 4100 and apparatus 4210 in accordance with one or more embodiments.

In step S100, the receiving radio frequency chain 4110 may receive an uplink pilot signal from the apparatus 4210 via the receiving antenna array 4140 and the transmitting antenna array 4150. In step S110, the electronic device 4130 may perform joint channel estimation based on the uplink pilot signal 5100 received by the receiving antenna array 4140 and the transmitting antenna array 4150, obtaining a joint channel matrix, and further obtaining the channel state of the downlink channel from the transmitting antenna array 4150 to the apparatus 4210. In step S200, the transmitting radio frequency chain 4120 may transmit downlink data via the transmitting antenna array 4150 using the obtained downlink channel state. In step S300, the receiving radio frequency chain 4110 may receive uplink data via the receiving antenna array 4140.

It is assumed that the receiving antenna array 4140 and the transmitting antenna array 4150 each have M antenna elements. To simplify the description, here, the apparatus 4100 (e.g., base station) communicates with only one apparatus 4210 (e.g., the k-th user equipment) at the same time and the same frequency. Therefore, the joint channel matrix is $G_J \in C^{2M \times 1}$.

The joint channel matrix $G_J$ includes a channel matrix $G_{UL} = g_k^{UL} \in C^{M \times 1}$ of the uplink channel from the apparatus 4210 to the receiving antenna array 4140, and a channel matrix $G'_{UL} = g'^{UL}_k \in C^{M \times 1}$ of the uplink channel from the apparatus 4210 to the transmitting antenna array 4150. Here, $g_k^{UL}$ is the uplink channel from the k-th user's apparatus 4210 to the receiving antenna array 4140, and $g'^{UL}_k$ is the uplink channel from the k-th user's apparatus 4210 to the transmitting antenna array 4150. That is, the joint channel matrix $G_J$ indicates the channel state of the uplink channel of the 2M×1 uniform linear antenna array arranged from the apparatus 4210 to the receiving antenna array 4140 and the transmitting antenna array 4150. Since the receiving antenna array 4140 is arranged in an interleaved manner with the transmitting antenna array 4150, the joint channel matrix $G_J$ may be expressed as:

$$G_J = P_J [G_{UL}^T, G'^T_{UL}]^T \in C^{2M \times 1} \quad \text{(Equation 7)}$$

In Equation 7, $P_J$ is a permutation matrix, which rearranges the lines of $[G_{UL}^T, G'^T_{UL}]^T$. The rearranged lines of $[G_{UL}^T, G'^T_{UL}]^T$ correspond to the joint uplink channel of the 2M×1 uniform linear antenna array. Here, since $[G_{UL}^T, G'^T_{UL}]^T$ is a column vector, $[G_{UL}^T, G'^T_{UL}]^T$ is left multiply the permutation matrix $P_J$ that performs line permutation for $[G_{UL}^T, G'^T_{UL}]^T$. In the case of $[G_{UL}^T, G'^T_{UL}]^T$ is a line vector, $[G_{UL}^T, G'^T_{UL}]^T$ is right multiply the permutation matrix $P_J$ that performs column permutation for $[G_{UL}^T, G'^T_{UL}]^T$.

As can be seen from the above, the joint uplink channel matrix $G_J$ obtained by the electronic device 4130 performing joint channel estimation is a rearrangement result of the combination of the uplink channel matrix $G_{UL}$ and the uplink channel matrix $G'_{UL}$. Therefore, the electronic device 4130 may perform permutation for the lines of the joint uplink channel matrix $G_J$ such that the first M lines correspond to the uplink channel from the apparatus 4210 to the receiving antenna array 4140, and the last M lines correspond to the uplink channel from the apparatus 4210 to the transmitting antenna array 4150. Thus, the electronic device 4130 may obtain the result of the uplink channel estimation from the apparatus 4210 to the receiving antenna array 4140, $\hat{G}_{UL}$, and the result of the uplink channel estimation from the apparatus 4210 to the antenna array 4150, $\hat{G}'_{UL}$. Then, the electronic device 4130 may obtain the result of the downlink channel estimation from the transmitting antenna array 4150 to the apparatus 4210, $\hat{G}_{DL}$, according to the result of the uplink channel estimation from the apparatus 4210 to the transmitting antenna array 4150, $\hat{G}'_{UL}$, based on the reciprocity between the uplink and downlink channels.

The estimation of the downlink channel state from the transmitting antenna array 4150 to the apparatus 4210, by using the above-described manner, has low algorithm complexity and can reduce the complexity of the signaling interaction process. In this case, the transmitting antenna array 4150 is coupled to both the transmitting radio frequency chain 4120 and the receiving radio frequency chain 4110 (shown in FIG. 6).

Further, in the case where the apparatus 4100 is in communication with a plurality of (for example, K) apparatus 4210 at the same time and the same frequency, the joint channel matrix is $G_J \in C^{2M \times K}$, $G_{UL}=[g_1^{UL}, g_2^{UL}, \ldots, g_K^{UL}] \in C^{M \times K}$, $G'_{UL}=[g_1'^{UL}, g_2'^{UL}, \ldots, g_K'^{UL}] \in C^{M \times K}$, and the permutation matrix $P_J$ can be adjusted accordingly.

FIG. 7 illustrates a frame structure for performing wireless communication between apparatus 4100 and apparatus 4210, in accordance with one or more embodiments.

The period 7100 of the uplink channel is divided into sub-periods 7110 and 7120. The period 7200 of the downlink channel is divided into sub-periods 7210 and 7220, which correspond to the sub-periods 7110 and 7120 of the uplink channel, respectively.

In sub-periods 7110 and 7210, electronic device 4130 performs control such that receiving radio frequency chain 4110 receives an uplink pilot signal from apparatus 4210 via receiving antenna array 4140 and transmitting antenna array 4150. In the sub-period 7120, the electronic device 4130 receives uplink data using the result of the uplink channel estimation from the apparatus 4210 to the receiving antenna array 4140, $\hat{G}_{UL}$, which is obtained through the joint channel estimation. In sub-period 7210, electronic device 4130 transmits downlink data using the result of the downlink channel estimation from transmitting antenna array 4150 to apparatus 4210, $\hat{G}_{DL}$.

The time period 7100 corresponds to the time period 7200, and they are substantially aligned in time or have a slight delay. The periods 7100 and 7200 as well as the sub-periods 7110, 7120, 7210, and 7220 may correspond to one or more frames, one or more sub-frames, one or more time slots, or one or more OFDM symbols. The uplink channel may be divided into a plurality of identical time periods 7100, and periods divided otherwise may be inserted among the plurality of time periods 7100 as well. Similarly, the downlink channel may be divided into a plurality of identical time periods 7200, and periods divided otherwise may be inserted among the plurality of time periods 7200 as well. The time period and sub-period in FIGS. 9, 11, and 13 described later also have such a nature.

In one or more embodiments of the invention, electronic device 4130 may obtain a downlink channel state from transmitting antenna array 4150 to apparatus 4210 based on a feedback signal from apparatus 4210. In this case, the first channel state is the uplink channel state from antenna 4210 to the receiving antenna array 4140 obtained by the receiving radio frequency chain 4110 based on the uplink pilot signal received by the receiving antenna array 4140 from the apparatus 4210, and the downlink channel state from transmitting antenna array 4150 to apparatus 4210 is obtained by the apparatus 4210 based on the downlink pilot signal received from the transmitting antenna array 4150 and is included in the feedback signal.

For example, the electronic device 4130 may perform control such that the downlink pilot signal is transmitted via the transmitting antenna array when the uplink pilot signal is received via the receiving antenna array 4140.

For example, the electronic device 4130 may perform control such that before the second channel state is obtained in a current time period, the transmitting antenna array 4150 is in operating mode 1 or operating mode 2. In operating mode 1, the transmitting antenna array 4150 is in idle state. In operating mode 2, the transmitting radio frequency chain 4120 transmits downlink data to the apparatus 4210 via the transmitting antenna array 4150 using the downlink channel state obtained in the prior time period.

FIG. 8 illustrates a flow chart of communication process between apparatus 4100 and apparatus 4210 in accordance with one or more embodiments.

In step 8100, the receiving radio frequency chain 4110 in apparatus 4100 may receive an uplink pilot signal from apparatus 4210 via the receiving antenna array 4140. In step 8200, the transmitting radio frequency chain 4120 in apparatus 4100 may transmit a downlink pilot signal to apparatus 4210 via the transmitting antenna array 4150. In step 8210, the receiving radio frequency chain 4110 in apparatus 4100 may estimate an uplink channel state from apparatus 4210 to receiving antenna array 4140 based on the uplink pilot signal, and provide the uplink channel state to electronic device 4130. In step 8220, apparatus 4210 may estimate a downlink channel state from transmitting antenna array 4150 to apparatus 4210 based on the received downlink pilot signal. In step 8300, the apparatus 4210 includes the estimation result of the downlink channel state as, for example, the downlink channel CSI (Channel State Information) in a feedback signal, and transmits the feedback signal to the apparatus 4100. In step 8410, the electronic device 4130 in the apparatus 4100 may obtain a downlink channel state from the transmitting antenna array 4150 to the apparatus 4210 based on the feedback signal.

For example, the electronic device 4130 may perform control such that the transmitting radio frequency chain 4120 transmits downlink data directly via the transmitting antenna array 4150 using the downlink channel state included in the feedback signal. Alternatively, the electronic device 4130 may transmit downlink data by combining (e.g., weighting, etc.) of the downlink channel state included in the feedback signal with the downlink channel state obtained by using a method of the other embodiments of the present invention and using the combined downlink channel state.

In addition, in step 8400, the electronic device 4130 has not yet obtained the downlink channel state, so the electronic device 4130 may cause the transmitting antenna array 4150 to be in idle state, or to transmit downlink data using the downlink channel state obtained in a prior period.

In the above scheme, the receiving radio frequency chain 4110 and the transmitting radio frequency chain 4120 are coupled to the receiving antenna array 4140 and the transmitting antenna array 4150, respectively. The receive radio frequency chain 4110 need not to be coupled to the transmitting antenna array 4150. Therefore, the hardware implementation is relative simple, but signaling interaction is more sophisticated.

FIG. 9 illustrates a frame structure for wireless communication between apparatus 4100 and apparatus 4210, in accordance with one or more embodiments of the present invention.

The period 9100 of the uplink channel is divided into three sub-periods 9110, 9120, and 9130. The period 9200 of the downlink channel is divided into three sub-periods 9210, 9220, and 9230, which correspond to the sub-periods 9110, 9120, and 9130 of the uplink channel, respectively.

In sub-period 9110, a receiving radio frequency chain 4110 may receive an uplink pilot signal from the apparatus 4210 via a receiving antenna array 4140. In sub-period 9210, a transmitting radio frequency chain 4120 may transmit a downlink pilot signal to the apparatus 4210 via a transmitting antenna array 4150.

In sub-period 9120, the receiving radio frequency chain 4110 may receive a downlink channel CSI feedback from the apparatus 4210 via the receiving antenna array 4140. In sub-period 9220, since the downlink channel CSI feedback has not been completely received at this time, downlink data cannot be transmitted using the downlink channel state in the period 9100. Accordingly, in sub-period 9200, the electronic device 4130 may perform control such that the transmitting antenna array 4150 is in the above-described operating mode 1 or operating mode 2.

In sub-period 9130, the receiving radio frequency chain 4110 may receive uplink data using the uplink channel estimation result from the apparatus 4210 to the receiving antenna array 4140 obtained by the apparatus 4100 based on the uplink pilot signal received in the period 9110. In sub-period 9230, the transmitting radio frequency chain 4120 may transmit downlink data using the downlink channel CSI feedback received in period 9120.

In accordance with one or more embodiments of the present invention, electronic device 4130 may estimate the downlink channel state based on the uplink channel state using a correlation between the uplink channel from the apparatus 4210 to the receiving antenna array 4140 and the downlink channel from the transmitting antenna array 4150 to apparatus 4210.

For example, the electronic device 4130 may obtain the downlink channel state by phase shifting the uplink channel state. This phase shifting may be performed by calculation or by a phase shifter in the electronic device 4130.

FIG. 10 illustrates a flow chart of communication process between apparatus 4100 and apparatus 4210 in accordance with one or more embodiments.

Referring to FIG. 10, in step 10100, the receiving radio frequency chain 4110 in apparatus 4100 may receive an uplink pilot signal from apparatus 4210 via the receiving antenna array 4140. In step 10210, the receiving radio frequency chain 4110 may estimate an uplink channel state from the apparatus 4210 to the receiving antenna array 4140 based on the received uplink pilot signal, and provide the estimated uplink channel state to the electronic device 4130 in the apparatus 4100. In step 10220, the electronic device 4130 may estimate the downlink channel state from the transmitting antenna array 4150 to the apparatus 4210 based on the obtained uplink channel state and provide the downlink channel state to the transmitting radio frequency chain 4120 in the apparatus 4100. In step 10300, the transmitting radio frequency chain may transmit downlink data via the transmitting antenna array 4150 using the downlink channel state.

In step 10400, the receiving radio frequency chain 4110 may receive uplink data using the uplink channel state.

In addition, in step 10200, the electronic device 4130 has not yet obtained the downlink channel state, so the transmitting radio frequency chain 4120 may transmit downlink data to the apparatus 4210 via the transmitting antenna array 4150 using the downlink channel state obtained in a prior time period.

In the above process, the electronic device 4130 may obtain the downlink channel state by phase shifting the uplink channel state based on a spatial correlation between the uplink channel and the downlink channel.

For example, in the case where the apparatus 4100 is in communication with K (K≥1) apparatus 4210, the downlink channel state may be obtained by multiplying the uplink channel matrix by the phase shifting matrix S. Here, the phase shifting matrix S can be expressed as:

$$S = \begin{bmatrix} e^{j2\pi \frac{D}{\lambda}\cos\theta_{1,0}} & \cdots & 0 \\ \vdots & \ddots & \vdots \\ 0 & \cdots & e^{j2\pi \frac{D}{\lambda}\cos\theta_{K,0}} \end{bmatrix}.$$

The above scheme is more suitable for the LOS channel and the millimeter wave channel. While for the NLOS channel, it results in deviation when estimating the downlink channel state, reducing the performance of beamforming performed using the downlink channel state. The performance loss is even more significant, in particular when the multipath angle expansion is large.

FIG. 11 illustrates a frame structure for wireless communication between apparatus 4100 and apparatus 4210, in accordance with one or more embodiments.

The period 11100 of the uplink channel is divided into two sub-periods 11110 and 11120. The period 11200 of the downlink channel is divided into two sub-periods 11210 and 11220, which correspond to the sub-periods 11110 and 11120 of the uplink channel, respectively, as illustrated in FIG. 11.

In sub-period 11110, the receiving radio frequency chain 4110 may receive an uplink pilot signal via the receiving antenna array 4140. In sub-period 11120, uplink data may be received via the receiving antenna array 4140.

In the sub-period 11210, the electronic device 4130 has not yet obtained the downlink channel state in the current time period 11100. So in sub-period 11210, the transmitting radio frequency chain 4120 may transmit downlink data using the downlink channel state obtained in a prior time period via the transmitting antenna array 4150. In sub-period 11200, the electronic device 4130 has obtained the downlink channel state in the current time period 11100 based on the uplink channel state, so the transmitting radio frequency chain 4120 may transmit the downlink data using the downlink channel state obtained in the current time period 11100 via the transmitting antenna array 4150.

In accordance with one or more embodiments of the present invention, the electronic device 4130 may perform beamforming on the downlink pilot signal using the uplink channel state from the apparatus 4210 to the receiving antenna array 4140. The transmitting radio frequency chain 4120 may transmit the beam-formed downlink pilot signal to the apparatus 4210 via the transmitting antenna array 4150.

The receiving radio frequency chain 4110 may then receive the downlink channel state from the transmitting antenna array 4150 to the apparatus 4210 from the apparatus 4210. Here, the downlink channel state is obtained by the apparatus 4210 based on the beam-formed downlink pilot signal.

For example, the electronic device 4130 may obtain an inaccurate downlink channel state based on the uplink channel state, and then perform beamforming on the downlink pilot signal using the obtained inaccurate downlink channel state. The inaccurate downlink channel state may be obtained by the electronic device 4130 using the spatial correlation between the uplink and downlink channels, which indicates the channel state of the downlink channel from the transmitting antenna array 4150 to the apparatus 4210.

FIG. 12 illustrates a flow chart of communication process between apparatus 4100 and apparatus 4210 in accordance with one or more embodiments. In FIG. 12, the processes in steps 12100, 12200, 12210, 12220, 12300 are similar to these in steps 10100, 10200, 10210, 10220, 10300 in FIG. 10, and will not be described further herein. However, the downlink channel state obtained by the electronic device 4130 based on the uplink channel state in step 10220 is referred to as an inaccurate downlink channel state in step 12220.

In step 12230, the transmitting radio frequency chain 4120 may perform beamforming on a downlink pilot signal using the inaccurate downlink channel state. In step 12400, the transmitting radio frequency chain 4120 may transmit the beam-formed downlink pilot signal via the transmitting antenna array 4150. In step 12410, the apparatus 4210 estimates the downlink channel state from the transmitting antenna array 4150 to the apparatus 4210 based on the received beam-formed downlink pilot signal. The processes in steps 12500, 12600, 12610, 12700, 12800 is similar to these in steps 8300, 8400, 8410, 8500, 8600 in FIG. 8, and will not be described further herein.

The above scheme is applicable to multiple channel environments and supports beam-formed downlink reference signal transmission mode, but its signaling interaction process is more sophisticated.

In one or more embodiments of the present invention, when the receiving radio frequency chain 4110 receives an uplink pilot signal or a downlink channel state from the apparatus 4210 via the receiving antenna array 4140, the transmitting radio frequency chain 4120 may transmit signals (e.g., data or downlink pilot signals) to the apparatus 4220 via the transmitting antenna array. For another example, when the transmitting radio frequency chain 4120 transmits signals (e.g., data or downlink pilot signals) to the apparatus 4210 via the transmitting antenna array 4150, the receiving radio frequency chain 4120 may receive the uplink pilot signal or downlink channel state from the apparatus 4220 via the receiving antenna array 4140.

Therefore, when the uplink channel is used to feedback the downlink channel CSI, the downlink channel can be used to transmit signals of other user equipments, thereby improving time utilization.

FIG. 13 illustrates a frame structure for wireless communication between apparatus 4100, apparatus 4210, and apparatus 4220, in accordance with one or more embodiments. In FIG. 13, the blank block area indicates the transmission and reception of signals related to apparatus 4210, and the shaded area indicates the transmission and reception of signals related to apparatus 4220.

The period 13100 in the uplink channel is divided into four sub-periods 1310, 13120, 13130, 13140. The period 13200 in the downlink channel is divided into four sub-periods 13210, 13220, 13230, 13240, which correspond to sub-periods 1310, 13120, 13130, 13140 in the uplink channel, respectively.

In sub-period 13110, the receiving radio frequency chain 4110 may receive an uplink pilot signal from apparatus 4210 via receiving antenna array 4140. The apparatus 4100 estimates the uplink channel state according to the uplink pilot signal reception condition of the apparatus 4210 as a reference for uplink transmission resource scheduling; and further estimates the downlink channel according to the correlation between the uplink channel and the downlink channel, and particularly determines the downlink channel direction for preprocessing the downlink pilot signal to obtain more accurate downlink channel feedback. In sub-period 13120, the receiving radio frequency chain 4110 may receive uplink data from apparatus 4210 via the receiving antenna array 4140. In sub-period 13130, the receiving radio frequency chain 4110 may receive a downlink CSI feedback from the apparatus 4210 via the receiving antenna array 4140, wherein the downlink CSI feedback of the apparatus 4210 is performed based on the reception condition of the preprocessed downlink pilot signal, thus can feedback more accurate channel state with less signaling resources. In sub-period 13140, the receiving radio frequency chain 4110 may receive uplink data from the apparatus 4210 via the receiving antenna array 4140.

In sub-period 13210, the transmitting radio frequency chain 4120 may transmit downlink data to the apparatus 4220 via the transmitting antenna array 4150, or be in idle. In sub-period 13220, the transmitting radio frequency chain 4120 may transmit, for example, a beam-formed downlink pilot signal to apparatus 4210 via the transmitting antenna array 4150, as described above, parameters of beamforming are derived based on calculation of the uplink channel state. Specifically, the beam-formed downlink pilot signal is made to be directed to the apparatus 4201. In sub-period 13230, the transmitting radio frequency chain 4120 may be idle or transmit downlink data to apparatus 4220 via the transmitting antenna array 4150 to take advantage of the downlink time periods. In sub-period 13240, the transmitting radio frequency chain 4120 may transmit downlink data to the apparatus 4210 via the transmitting antenna array 4150, wherein the apparatus 4100 determines the downlink data signal transmission mode based on the downlink CSI feedback received in sub-period 13130, specifically, the determination of the modulation and coding scheme of the downlink data signal is based, e.g. on the CQI included in the CSI, for another example, based on the channel direction information contained therein, such as PMI, the downlink data signal is subjected to processes of pre-coding/beamforming and/or the like to be transmitted in sub-period 13240 through the transmitting radio frequency chain 4120.

Referring to FIG. 13, the period 13300 in the uplink channel and the period 13400 in the downlink channel are divided in the same manner as the period 13100 and the period 13200, respectively. The difference is that, the apparatus to which the signals transmitted or received in respective sub-periods in periods 13300 and 13400 are directed is opposite to the apparatus for which the signals transmitted or received in respective sub-periods in periods 13300 and 13400 are directed. For example, the uplink pilot signal from the apparatus 4210 is received in sub-period 1310 in the period 13100, while the uplink pilot signal from the apparatus 4220 is received in the sub-period 13310 corresponding to the sub-period 13110 in the period 13300, and so on. The example of FIG. 13 is particularly applicable to scenarios where the apparatus 4100 employs a large-scale antenna, thus the channel estimation accuracy may be improved without additionally increasing pilot transmission.

The electronic device 4130, the flow of communication process, and the corresponding frame structure in accordance with one or more embodiments of the present invention are described above.

A method for performing wireless communication which can be performed in the electronic device 4130 is described below.

FIG. 14 illustrates a method 14000 for performing wireless communication in accordance with one or more embodiments of the present invention. As illustrated in FIG. 14, at step 14100, a first channel state is obtained, the first channel state including at least a channel state of a channel from an apparatus 4210 to a receiving antenna array 1440 associated with an electronic device 1430. In step 14200, a second channel state is obtained based on the first channel state, the second channel state including a channel state of a channel from a transmitting antenna array 1450 to the apparatus 4210 associated with the electronic device 1430.

The implementation of the specific steps in method 14000 has been described above with reference to FIGS. 5-13 and will not be described further herein.

The device and process at base station end have been described above, and related wireless communication methods are described. In the following, the device and process at user end will be described.

3. DEVICE AND PROCESS AT USER END

FIG. 15 illustrates a specific structure of an apparatus 4210 in accordance with one or more embodiments of the present invention. The apparatus 4210 may include an electronic device 15100, an antenna 15200, and other components (not shown). Similar to the electronic device 4130 in the apparatus 4100, the electronic device 15100 may also be implemented to include one or more of the antenna 15200 or other components in the apparatus 4210, or implemented as the apparatus 4210 itself.

According to one or more embodiments of the present invention, the electronic device 15100 may transmit an uplink pilot signal to the apparatus 4100 to enable the apparatus 4100 to obtain a first channel state and obtain a channel state of a downlink channel from a transmitting antenna array 4150 of the apparatus 4100 to the antenna 15200 based on the first channel state. Here, the first channel state includes at least a channel state of an uplink channel from the antenna 15200 to a receiving antenna array 4140 of the apparatus 4100. The electronic device 15100 may receive a data signal transmitted by the apparatus 4100 using the downlink channel state.

For example, the first channel state may also include the channel state of the uplink channel from the antenna 15200 to the transmitting antenna array 4150.

For example, the electronic device 15100 may receive a downlink pilot signal from the transmitting antenna array 4150 via the antenna 15200. The electronic device 15100 may then obtain the downlink channel state of the downlink channel from the transmitting antenna array 4150 to the antenna 15200 based on the downlink pilot signal, and transmit the downlink channel state to the apparatus 4100.

For example, the downlink channel state may be derived by the apparatus 4100 using a spatial correlation between the channel from the antenna 15200 to the receiving antenna array 4140 antenna and the channel from the transmitting antenna array 4150 to the antenna 15200 based on the first channel state estimation.

For example, the electronic device 15100 may receive, via the antenna 15200, a downlink pilot signal after performing beamforming on the downlink pilot signal using the first channel state. The electronic device 15100 may obtain a downlink channel state based on the beam-formed downlink pilot signal and transmit the downlink channel state to the apparatus 4100.

The specific details of the first channel state and the downlink channel state and how to obtain them have been described above in describing process in the apparatus 4100, which will not be described further herein.

The electronic device 15100 in the apparatus 4210 has been described above. The wireless communication method performed in the apparatus 4210 will be described below.

FIG. 16 illustrates a method 16000 for wireless communication in accordance with one or more embodiments of the present invention.

In step 16100, a first pilot signal is transmitted from an apparatus 4210 to an apparatus 4100 to enable the apparatus 4100 to obtain a first channel state and obtain a channel state of a downlink channel from a transmitting antenna array 4150 of the apparatus 4100 to the apparatus 4210 based on the first channel state. Here, the first channel state includes at least a channel state of an uplink channel from the antenna 15200 to a receiving antenna array 4140 of the apparatus 4100.

In step 16200, a data signal transmitted from the apparatus 4100 using a downlink channel state is received.

The device and process at user end have been described above, and the related wireless communication method has been described. In the following, the antenna at base station end will be described.

4. ANTENNA DESIGN

Referring back to FIG. 4, the transmitting antenna array 4150 and the receiving antenna array 4140 may transmit signals at the same frequency and the same time, thereby achieving a full-duplex communication.

For example, the transmitting antenna array 4150 and the receiving antenna array 4140 may have a spatial correlation. As such, this spatial correlation may be utilized to estimate the downlink channel state based on the uplink channel state.

In FIG. 4, respective antenna elements of the transmitting antenna array 4150 and the receiving antenna array 4140 are arranged in an interleaved manner. Alternatively, the transmitting antenna array 4150 and the receiving antenna array 4140 may also adopt the arrangement shown in FIG. 17. In FIG. 17, the transmitting antenna array 4150 and the receiving antenna array 4140 are two adjacent sub-arrays of a linear array. Combinations of FIGS. 4 and 17 are also possible, for example, the transmitting antenna array 4150 may be partially arranged in an interleaved manner with the receiving antenna array 4140. In addition to the arrangements shown in FIGS. 4 and 17, the transmitting antenna array 4150 and the receiving antenna array 4140 may adopt other arrangements that make them to have a spatial correlation.

Moreover, in one or more embodiments of the invention, the transmitting antenna array 4150 and the receiving antenna array 4140 may not have spatial correlation as well. Thus, the transmitting antenna array 4150 and the receiving antenna array 4140 may also adopt an arrangement that does not have spatial correlation.

The case where the transmitting antenna array 4150, the receiving antenna array 4140, or a combination thereof is a linear array has been described above. In one or more embodiments of the invention, the transmitting antenna array 4150, the receiving antenna array 4140, or a combination thereof may also be a 3D antenna.

For example, in a 3D MIMO system, the apparatus 4100 may employ a Uniformly-spaced rectangular array (URA) to obtain degrees of freedom in the vertical and horizontal directions and to generate a three-dimensional beam. In the present invention, the equivalent spacing of the downlink antenna array is $D'=\lambda$, which is greater than half a wavelength, and an additional erroneous beam would be generated in the non-target direction when performing beamforming, which would cause a larger inter-user interference.

As illustrated in FIG. 18, it can be seen that larger antenna spacing can result in narrower beam, but will generate an additional beam in the direction with an angle greater than $\pi/2$. In a practical system, the horizontal angle of departure (A-AoD) and angle of arrival (A-AoA) are usually randomly distributed between $[0,\pi]$, which indicates that an antenna array with spacing greater than half a wavelength in the horizontal direction will cause a larger inter-user interference. While in a 3D MIMO system, the vertical angle of departure (E-AoD) and angle of arrival (E-AoA) are generally smaller than $\pi/2$, so the additional erroneous beam generated in the vertical direction would not cause inter-user interference. Therefore, the present invention is well suitable for 3D MIMO systems. In one or more embodiments of the present invention, respective antenna elements of the transmitting antenna array and the receiving antenna array may be arranged in an interleaved manner in the vertical direction and in a continuous manner in the horizontal direction.

FIG. 19 presents a specific arrangement of 8×8 URA in accordance with one or more embodiments of the present invention. The transmitting antenna array and the receiving antenna array are continuous in the horizontal direction and are arranged in an interleaved manner with each other in the vertical direction, as illustrated in FIG. 19.

Moreover, although the transmitting antenna array 4150 and the receiving antenna array 4140 are described herein with the example of a uniform linear array and a uniform rectangular array, the transmitting antenna array 4150 and the receiving antenna array 4140 may take the form of a non-uniform array as well. For example, the spacing between the antenna elements of the transmitting antenna array 4150 can be increased or decreased in the vertical direction as the height increases, and the receiving antenna array 4140 may also adopt this kind of arrangement. In 3D MIMO, the transmitting antenna array 4150 and the receiving antenna array 4140 may adopt the above-described non-uniform arrangement in the vertical direction and a uniform arrangement in the horizontal direction. The arrangement of non-uniform antennas is specifically described in the patent application entitled "Non-Uniform Antenna Array and Signal Processing thereof", filed on Jan. 26, 2016, Application No. 201610051745.X, by the same applicant of the present application, the entire contents which is hereby incorporated herein by reference. In addition, a non-uniform arrangement and an interleaved arrangement may be used in combination by the transmitting antenna array 4150 and the receiving antenna array 4140.

5. SIMULATION RESULT

FIGS. 19-24 illustrate simulation result in the case of employing an electronic device and communication method in accordance with one or more embodiments of the present invention.

A one-cell-multiple-user scenario is considered, and the cell's central base station is configured with the ULA. Set the user's angle of arrival to be evenly distributed at $[0, \pi/2]$ to avoid interferences generated from erroneous beam. At the same time, it is assumed that self-interference is effectively eliminated and its effects are ignored. Since the uplink spectrum efficiency is independent of the antenna spacing, this simulation only focuses on the spectrum efficiency of the downlink beamforming.

Table 1 presents system simulation parameters that adopted, wherein it is assumed that the multipath angular expansion obeys a uniform distribution.

TABLE 1

| simulation system parameters | |
|---|---|
| Cell inner diameter $r_{min}$ | 50 m |
| Cell outer diameter $r_{max}$ | 250 m |
| Number of users K | 8 |
| Path loss coefficient | 3.5 |
| Shadow fading coefficient | 8 dB |
| Number of antennas M | 8, 16, 32, 64, 128 |
| Carrier frequency f | 2 GHz |
| Antenna spacing D | $\lambda/2$ |
| Number of multipath P | 10 |
| NLOS channel angle expansion | 30 degree |
| LOS channel angle expansion | 5 degree | i. NLOS Channel Scenario Simulation

FIG. 20 is a cumulative distribution function diagram of the downlink average spectrum efficiency of the cell in the NLOS channel scenario. Here, the schemes of traditional separated antenna structure, the accurate downlink channel estimation using the interleaved structure and the approximate downlink channel estimation with the phase shifter are simulated respectively. Wherein, the number of antennas M=8 and the signal-to-noise ratio SNR=20 db are adopted. As it can be seen, the downlink spectrum efficiency of the schemes of the accurate downlink channel estimation using the interlaced structure and the approximate downlink channel estimation with the phase shifter according to one or more embodiments of the present invention is more efficient. However, if the phase shifter is used to estimate the downlink channel, the resulting downlink beamforming vector deviation would increase inter-user interference, thus reducing system performance.

FIG. 21 is a diagram of the downlink average spectrum efficiency performance of a cell in an NLOS channel scenario and different signal to noise ratio environments. Here, the number of antennas M=8 is adopted. As the signal-to-noise ratio increases, the spectrum efficiency of the scheme provided by the present invention will be even higher than that of the traditional scheme.

FIG. 22 shows the performance comparison of the downlink average spectrum efficiency of the cell in the NLOS channel scenario and with different number of antennas. Here, the signal-to-noise ratio SNR=20 dB is adopted. Increasing the number of antennas will improve the performance of all schemes because a narrower downlink beam will be produced. Meanwhile, the performance of the scheme provided by the present invention will be improved more quickly, and the performance gap from the traditional scheme will also be widen. However, the performance degradation due to the deviation caused by the phase shifter still exists and would not decrease as the number of antenna increases.

Ii. LOS Channel Scenario Simulation

FIG. 23, FIG. 24, and FIG. 25 present simulation comparisons of the LOS channel scenarios with corresponding simulation parameters in the above NLOS channel scenario, respectively. The results show that the performance of the present invention in the LOS channel scenario is still superior to the traditional scheme, and the scheme of estimating the downlink channel with the phase shifter will not bring performance loss. This is because in the LOS channel scenario, the line-of-sight channel occupies the dominated energy, and the estimation of phase shifter is more accurate.

6. APPLICATION EXAMPLES

For example, the apparatus 4100 may be realized as any type of evolved Node B (eNB) such as a macro eNB, and a small eNB. A small eNB may be an eNB that covers a cell smaller than a macro cell, such as a pico eNB, a micro eNB, and home (femto) eNB. Instead, the apparatus 4100 may be realized as any other types of base stations such as a NodeB and a base transceiver station (BTS). The apparatus 4100 may include a main body (that is also referred to as a base station device) configured to control wireless communication, and one or more remote wireless heads (RRH) disposed in a different place from the main body. Additionally, various types of terminals to be discussed later may also operate as the apparatus 4100 by temporarily or semi-permanently executing a base station function.

For example, the apparatus 4210 may be realized as a mobile terminal (such as a smart phone, a tablet personal computer (PC), a notebook PC, a portable game terminal, a portable/dongle type mobile router, and a digital camera apparatus) or an in-vehicle terminal (such as a car navigation device). The apparatus 4210 may also be realized as a terminal (that is also referred to as a machine type communication (MTC) terminal) that performs machine-to-machine (M2M) communication. Furthermore, the apparatus 4210 may be a wireless communication module (such as an integrated circuit module including a single die) mounted on each of the above terminals.

4-2. Application Examples Regarding Apparatus 4100

First Application Example

FIG. 26 is a block diagram illustrating a first example of a schematic configuration of an eNB to which the technology of the present disclosure may be applied. An eNB 800 includes one or more antennas 810 and a base station device 820. The base station device 820 and each antenna 810 may be connected to each other via an RF cable.

Each of the antennas 810 includes a single or multiple antenna elements (such as multiple antenna elements included in a multiple input multiple output (MIMO) antenna), and is used for the base station device 820 to transmit and receive wireless signals. The eNB 800 may include the multiple antennas 810, as illustrated in FIG. 26. For example, the multiple antennas 810 may be compatible with multiple frequency bands used by the eNB 800. Although FIG. 26 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of higher layers of the base station device 820. For example, the controller 821 generates a data packet from data in signals processed by the wireless communication interface 825, and transfers the generated packet via the network interface 823. The controller 821 may bundle data from multiple base band processors to generate the bundled packet and transfer the generated bundled packet. The controller 821 may have logic functions of performing control such as radio resource control, radio bearer control, mobility management, admission control, and scheduling. This control may be performed in conjunction with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulation/demodulation, and multiplexing/demultiplexing, and performs various types of signal processing of layers (such as L1, medium access control (MAC), radio link control (RLC), and packet data convergence protocol (PDCP)). The BB processor 826 may have a part or all of the above-described logical functions Instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 26. For example, the multiple BB processors 826 may be compatible with multiple frequency bands used by the eNB 800. The wireless communication interface 825 may include the multiple RF circuits 827, as illustrated in FIG. 26. For example, the multiple RF circuits 827 may be compatible with multiple antenna elements. Although FIG. 26 illustrates the example in which the wireless communication interface 825 includes the multiple BB processors 826 and the multiple RF circuits 827, the wireless communication interface 825 may also include a single BB processor 826 or a single RF circuit 827.

Second Application Example

FIG. 27 is a block diagram illustrating a second example of a schematic configuration of an eNB to which the technology of the present disclosure may be applied. An eNB 830 includes one or more antennas 840, a base station device 850, and an RRH 860. The RRH 860 and each antenna 840 may be connected to each other via an RF cable. The base station device 850 and the RRH 860 may be connected to each other via a high speed line such as an optic fiber cable.

Each of the antennas 840 includes a single or multiple antenna elements (such as multiple antenna elements included in a MIMO antenna) and is used for the RRH 860 to transmit and receive wireless signals. The eNB 830 may include the multiple antennas 840, as illustrated in FIG. 27. For example, the multiple antennas 840 may be compatible with multiple frequency bands used by the eNB 830. Although FIG. 27 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 26.

The wireless communication interface 855 supports any cellular communication scheme (such as LTE and LTE-Advanced) and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 26, except that the BB processor 856 is connected to the RF circuit 864 of the RRH 860 via the connection interface 857. The wireless communication interface 855 may include the multiple BB processors 856, as illustrated in FIG. 27. For example, the multiple BB processors 856 may be compatible with multiple frequency bands used by the eNB 830. Although FIG. 27 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communicating in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives wireless signals via the antenna 840. Wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 27. For example, the multiple RF circuits 864 may support multiple antenna elements. Although FIG. 27 illustrates the example in which the wireless communication interface 863 includes the multiple RF circuits 864, the wireless communication interface 863 may also include a single RF circuit 864.

In the eNB 800 and the eNB 830 illustrated in FIGS. 26 and 27, the use of the electronic devices 4130 and 15100 may be realized by the wireless communication interface 825 and the wireless communication interface 855 and/or the wireless communication interface 863. At least a portion of the functionality may also be realized by controller 821 and controller 851.

4-3. Application Examples Regarding Apparatus 4210

First Application Example

FIG. 28 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme (such as LTE and LTE-Advanced) and performs wireless communication. The wireless communication interface 912 may typically include, for example, a BB processor 913 and an RF circuit 914. The BB processor 913 may perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 912 may be one chip module that has the BB processor 913 and the RF circuit 914 integrated thereon. The wireless communication interface 912 may include the multiple BB processors 913 and the multiple RF circuits 914, as illustrated in FIG. 28. Although FIG. 28 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include multiple antennas 916, as illustrated in FIG. 28. Although FIG. 28 illustrates the example in which the smartphone 900 includes the multiple antennas 916, the smartphone 900 may also include a single antenna 916.

Furthermore, the smart phone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smart phone 900 illustrated in FIG. 28 via feeder lines, which are partially shown as dashed lines in the figure. The auxiliary controller 919 operates a minimum necessary function of the smartphone 900, for example, in a sleep mode.

In the smartphone 900 illustrated in FIG. 28, the electronic devices 4130 and 15100 may be realized by the wireless communication interface 912. At least a portion of the functionality may also be realized by processor 901 or auxiliary controller 919.

Second Application Example

FIG. 29 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, and a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores data and a program that is executed by the processor 921.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme (such as LTE and LTE-Advanced) and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may also be one chip module having the BB processor 934 and the RF circuit 935 integrated thereon. The wireless communication interface 933 may include the multiple BB processors 934 and the multiple RF circuits 935, as illustrated in FIG. 29. Although FIG. 29 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme, such as a short-distance wireless communication scheme, a near-field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna) and is used for the wireless communication interface 933 to transmit and receive wireless signals. The car navigation device 920 may include the multiple antennas 937, as illustrated in FIG. 29. Although FIG. 29 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 29 via feeders lines that are partially shown as dashed lines in the figure. The battery 938 accumulates power supplied from the vehicle.

In the car navigation device 920 illustrated in FIG. 29, the electronic devices 4130 and 15100 may be realized by the wireless communication interface 933. At least a portion of the functionality may also be realized by processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

7. CONCLUSION

An apparatus in a communication system and a corresponding communication process method according to one or more embodiments of the present invention are described above.

Although the electronic devices 4130 and 15100 are described herein as performing various operations, these operations may in practical be performed by circuits in the electronic devices 4130 and 15100. Moreover, operations that are described herein as performed by other components may also be performed by electronic devices 4130 and 15100, or under the control of devices 4130 and 15100. For example, one or more operations performed by a transmitting radio frequency chain 4150 and a receiving radio frequency chain 4140 may be performed by electronic devices 4130 and 15100 or under the control of devices 4130 and 15100.

The electronic devices 4130 and 15100 may be realized as chips or as a complete apparatus, such as devices 4100 and 4210 themselves. Furthermore, electronic devices 4130 and 15100 may include, in addition to circuits, an interface to exchange signals with other components or apparatus.

Moreover, the order of processing flow and method flow described herein is not limited to the order described in the specification and the drawings. The order of some steps and flows may be exchanged or executed in parallel.

The detailed description set forth above in connection with the accompanying drawings describes examples, and is neither to denote the only examples that can be realized, nor denote the only examples within the scope of the claims. The words "example" and "exemplary", when used in the specification, mean "used as an example, instance or description," and does not mean "preferred" or "more beneficial than other examples." The detailed description includes specific details to provide an understanding of the described technologies. However, these technologies may be practiced without these specific details. In some instances, well known structures and apparatus are shown in the form of block in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the present disclosure may be implemented or performed with a general purpose processor, a digital signal processor (DSP), an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, and/or state machine. A processor may also be implemented as a combination of computing devices, e.g., a combination of a DSP and a microprocessor, a plurality of microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on a computer readable medium or transmitted as one or more instructions or code on a computer readable medium. Other examples and implementations are within the scope and spirit of the disclosure and the appended claims. For example, in view of the nature of the software, the functions described above may be performed using software executed by a processor, hardware, firmware, hardwired, or any combination of thereof. Features that implement the functions may also be physically placed at various locations, including being distributed such that portion of the functionality are realized at different physical locations.

Furthermore, the disclosure of components contained within or separate from other components should be considered as exemplary, as various other architectures may potentially be realized to achieve the same functionality, including incorporation of all, a majority part of, and/or some of the elements as one or more single structures or a portion of a separated structure.

Computer readable media includes both computer storage media and communication media that includes any medium that facilitates transfer of a computer program from one place to another. A storage medium may be any available media that may be accessed by a general purpose or special purpose computer. By way of example and not limitation, a computer readable medium may comprise RAM, ROM, EEPROM, flash memory, CD-ROM, DVD or other optical disk storage, disk storage or other magnetic storage device, or any other medium that can be used to carry or store desired program code component in the form of instruction or data structure and that can be accessed by a general purpose or special purpose computer or a general purpose or special purpose processor. Also, any connection is appropriately referred to as a computer-readable medium. For example, if the software is transmitted from a website, server, or other remote source using coaxial cable, optic fiber cable, twisted pair, digital subscriber line (DSL), or wireless technologies such as infrared, radio, and microwave, then the coaxial cable, optical fiber cable, twisted pair, DSL, or wireless technologies such as infrared, radio, and microwave are included in the definition of the medium. Disks and discs as used herein include compact discs (CDs), laser discs, optical discs, digital versatile discs (DVDs), floppy discs, and Blu-ray discs, where the disk typically magnetically replicates data while the disc optically replicates data using a laser. Combinations of the above are also included within the scope of computer readable media.

The foregoing description of the disclosure is provided to enable a person skilled in the art to make or use the disclosure. The various modifications of the present disclosure will be apparent to those skilled in the art, and the general principles defined herein may be applied to other variations without departing from the scope of the present disclosure. Accordingly, the present disclosure is not limited to the examples and designs described herein, rather, it corresponds to the broadest scope consistent with the disclosed principles and novel features.

What is claimed is:

1. An electronic device characterized in that the electronic device comprises:
    circuitry configured to
    obtain a first channel state comprising at least a channel state of a channel from a first apparatus to a first antenna associated with the electronic device, the first apparatus performing wireless communication with the electronic device,
    obtain a second channel state based on the first channel state, the second channel state comprising a channel state of a channel from a second antenna associated with the electronic device to the first apparatus,
    wherein the first antenna and the second antenna transmit or receive a signal at a same frequency or a same time and the first antenna and the second antenna is spatial correlated,
    wherein the first channel state further comprises a channel state of a channel from the first apparatus to the second antenna associated with the electronic device,
    wherein the first channel state is obtained by joint channel estimation based on a first pilot signal received by the first antenna and the second antenna from the first apparatus, and the first channel state is a joint channel matrix obtained by the joint channel estimation, and
    wherein the circuitry is configured to obtain the second channel state by permuting lines or columns of the joint channel matrix.

2. The electronic device of claim 1, wherein
    the circuitry is configured to obtain the second channel state also by a feedback signal from the first apparatus,
    the first channel state is obtained based on a first pilot signal received by the first antenna from the first apparatus, and
    the second channel state is obtained by the first apparatus based on a second pilot signal received from the second antenna, and is included in the feedback signal.

3. The electronic device of claim 2, wherein the circuitry performs control such that the second pilot signal is transmitted via the second antenna when the first pilot signal is received via the first antenna, and
    wherein the circuitry performs control such that before the second channel state is obtained in a current time period:
    the second antenna is in idle state, or
    a data signal is transmitted via the second antenna to the first apparatus using a second channel state obtained in a prior time period.

4. The electronic device of claim 1, wherein the circuitry is configured to:
    estimate the second channel state based on the first channel state using a spatial correlation between the channel from the first apparatus to the first antenna and the channel from the second antenna to the first apparatus.

5. The electronic device of claim 4, wherein the circuitry is configured to:
    obtain the second channel state by phase shifting the first channel state, wherein the circuitry comprises a phase shifter performing the phase shifting.

6. The electronic device of claim 4, wherein the circuitry performs control such that:
    a data signal is transmitted via the second antenna to the first apparatus using a second channel state obtained in a prior time period when a first pilot signal is received via the first antenna.

7. The electronic device of claim 1, wherein the circuitry is configured to:
    perform beam-forming on the second pilot signal using the first channel state, and transmitting the beam-formed second pilot signal via the second antenna to the first apparatus,
    receive the second channel state from the first apparatus, wherein the second channel state is obtained by the first apparatus based on the beam-formed second pilot signal.

8. The electronic device of claim 7, wherein the circuitry is configured to:
    perform beam-forming on the second pilot signal using a third channel state obtained based on the first channel state,
    wherein the third channel state is obtained using a spatial correlation between the channel from the first apparatus to the first antenna and the channel from the second antenna to the first apparatus, and comprises a channel state of the channel from the second antenna associated with the electronic device to the first apparatus.

9. The electronic device of claim 7, wherein the circuitry performs control such that one of the following operations is performed:
    a signal is transmitted via the second antenna to a second apparatus when the first pilot signal or the second channel state is received via the first antenna from the first apparatus, or
    a third pilot signal or a channel state of a channel from the second antenna to the second apparatus is received via the first antenna from the second apparatus when a signal is transmitted via the second antenna to the first apparatus.

10. The electronic device of claim 1, wherein
    the first antenna and the second antenna each comprises multiple antenna elements, and
    the multiple antenna elements of the first antenna and the multiple antenna elements of the second antenna are arranged in an interleaved manner or are two neighbor sub-arrays of a linear array.

11. The electronic device of claim 1, wherein the electronic device is implemented as a base station, the first antenna and the second antenna are incorporated in the electronic device, and the electronic device further comprises a first radio frequency chain and a second radio frequency chain coupled respectively to the first antenna and the second antenna, wherein the first radio frequency chain is further coupled to the second antenna.

12. A method for performing wireless communication characterized in that the method comprises:
    obtaining a first channel state comprising at least a channel state of a channel from a first apparatus to a first antenna associated with an electronic device, the first apparatus performing wireless communication with the electronic device, obtaining a second channel state based on the first channel state, the second channel state comprising a channel state of a channel from a second antenna associated with the electronic device to the first apparatus, wherein the first antenna and the second antenna transmit or receive a signal at a same frequency or a same time and the first antenna and the second antenna is spatial correlated, wherein the first channel state further comprises a channel state of a channel from the first apparatus to the second antenna associated with the electronic device, wherein the first channel state is obtained by joint channel estimation based on a first pilot signal received by the first antenna and the second antenna from the first apparatus, and the first channel state is a joint channel matrix obtained by the joint channel estimation, and wherein the second channel state is obtained by permuting lines or columns of the joint channel matrix.

13. An electronic device characterized in that the electronic device comprises:

circuitry configured to transmit a first pilot signal to another electronic device such that the another electronic device are able to obtain a first channel state and obtain a second channel state based on the first channel state, wherein the first channel state comprises at least a channel state of a channel from an antenna associated with the electronic device to a first antenna associated with the another electronic device, the second channel state comprises a channel state of a channel from a second antenna associated with the another electronic device to the antenna associated with the electronic device, and the electronic device performs wireless communication with the another electronic device; and receive a data signal transmitted from the another electronic device using the second channel state wherein the circuitry is configured to:

receive a beam-formed second pilot signal resulting from performing beam-forming on a second pilot signal using the first channel state, obtain the second channel state based on the beam-formed second pilot signal, and transmit the second channel state to the another electronic device.

14. The electronic device of claim 13, wherein the first channel state further indicates a channel state of a channel from the antenna associated with the electronic device to the second antenna associated with the another electronic device.

15. The electronic device of claim 13, wherein the circuitry is configured to:

receive a second pilot signal from the second antenna;

obtain the second channel state based on the second pilot signal; and transmit the second channel state to the another electronic device.

16. The electronic device of claim 13, wherein the second channel state is estimated by the another electronic device based on the first channel state using a spatial correlation between the channel from the antenna associated with the electronic device to the first antenna and the channel from the second antenna to the antenna associated with the electronic device.

17. A method for performing wireless communication, characterized in that the method comprises:

transmitting a first pilot signal from a first electronic device to a second electronic device such that the second electronic device are able to obtain a first channel state and obtain a second channel state based on the first channel state, wherein the first channel state indicates at least a channel state of a channel from the first electronic device to a first antenna associated with the second electronic device, the second channel state indicates a channel state of a channel from a second antenna associated with the second electronic device to the first electronic device, the first electronic device performs wireless communication with the second electronic device; and receiving a data signal transmitted from the second electronic device using the second channel state, wherein the first channel state is obtained by joint channel estimation based on the first pilot signal received by the first antenna and the second antenna from the second electronic device, and the first channel state is a joint channel matrix obtained by the joint channel estimation, and wherein the second channel state is obtained by permuting lines or columns of the joint channel matrix.

18. A non-transitory computer-readable storage medium including computer executable instructions, wherein the instructions, when executed by an electronic device, cause the electronic device to perform the method, the method comprising:

obtaining a first channel state comprising at least a channel state of a channel from a first apparatus to a first antenna associated with an electronic device, the first apparatus performing wireless communication with the electronic device; and obtaining a second channel state based on the first channel state, the second channel state comprising a channel state of a channel from a second antenna associated with the electronic device to the first apparatus, wherein the first antenna and the second antenna transmit or receive a signal at a same frequency or a same time and the first antenna and the second antenna is spatial correlated, wherein the first channel state further comprises a channel state of a channel from the first apparatus to the second antenna associated with the electronic device, wherein the first channel state is obtained by joint channel estimation based on a first pilot signal received by the first antenna and the second antenna from the first apparatus, and the first channel state is a joint channel matrix obtained by the joint channel estimation, and wherein the second channel state is obtained by permuting lines or columns of the joint channel matrix.

* * * * *